United States Patent
Ando

(10) Patent No.: US 8,256,699 B2
(45) Date of Patent: Sep. 4, 2012

(54) WEBBING TAKE-UP DEVICE

(75) Inventor: Takayoshi Ando, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 247 days.

(21) Appl. No.: 12/764,008

(22) Filed: Apr. 20, 2010

(65) Prior Publication Data
US 2010/0264245 A1    Oct. 21, 2010

(30) Foreign Application Priority Data

Apr. 21, 2009 (JP) ................. 2009-102892
Apr. 21, 2009 (JP) ................. 2009-102893

(51) Int. Cl.
B65H 75/48    (2006.01)
(52) U.S. Cl. .................... 242/374; 242/394.1
(58) Field of Classification Search ............ 242/374, 242/390, 390.8–390.9, 394, 394.1
See application file for complete search history.

(56) References Cited

U.S. PATENT DOCUMENTS
2011/0101145 A1* 5/2011 Maemura et al. .......... 242/390.8

FOREIGN PATENT DOCUMENTS
| DE | 10 2008 004 128 A1 | 6/2008 |
|---|---|---|
| DE | 10 2008 004 127 A1 | 7/2008 |
| EP | 1886883 A1 * | 2/2008 |
| EP | 2246225 A1 | 11/2010 |
| JP | 2006-282097 A | 10/2006 |
| JP | 2009298215 A * | 12/2009 |
| WO | 2006/123750 A1 | 11/2006 |
| WO | 2008081675 A1 | 7/2008 |
| WO | 2008149746 A1 | 12/2008 |

OTHER PUBLICATIONS

The extended European Search report EP Application 10 16 0620 mailed Jan. 28, 2011.

* cited by examiner

*Primary Examiner* — Sang Kim
(74) *Attorney, Agent, or Firm* — Roberts Mlotkowski Safran & Cole P.C.

(57) ABSTRACT

A webbing take-up device includes a speed-reduction mechanism that reduces rotation speed of a motor to transmit rotation force to a take-up shaft. An overload release mechanism is disposed at a middle position of the speed-reduction mechanism. The overload release mechanism includes a large-diameter gear rotating with the rotation speed of the motor being reduced and the rotation force being transmitted, a spring member mounted to the large-diameter gear, and a small-diameter gear provided to rotate relatively to the large-diameter gear, rotating the take-up shaft when the rotation speed thereof is reduced and the rotation force is transmitted to the take-up shaft, engaging with the spring member to become a state where relative rotation with respect to the large-diameter gear is stopped, and slides with the spring member when the rotation force acts between the large-diameter gear to become a state where relative rotation to the large-diameter gear is allowed.

8 Claims, 11 Drawing Sheets

WEBBING TAKE-UP DEVICE

CROSS-REFERENCE TO RELATED APPLICATION

This application claims priority under 35 USC 119 from Japanese Patent Application Nos. 2009-102892 and 2009-102893 filed Apr. 21, 2009, the disclosures of which are incorporated by reference herein.

BACKGROUND OF THE INVENTION

1. Technical Field

The present invention relates to a webbing take-up device that takes up a webbing for restraining a vehicle occupant to a take-up shaft and more particularly, to a webbing take-up device that rotates a take-up shaft by the driving force of a motor.

2. Related Art

In conventional webbing take-up devices, a speed reduction mechanism is interposed between a take-up shaft to take up a webbing and a motor (for example, refer to Japanese Patent Application Laid-Open (JP-A) No. 2006-282097). A clutch wheel is provided in the speed reduction mechanism. The clutch wheel includes a base member that can be connected to the take-up shaft and a gear member that receives the rotation force of the motor and rotates. A torque limiter (an overload release mechanism) is provided between the base member and the gear member. The overload release mechanism includes internal teeth that are formed in an inner circumferential portion of the gear member, a plate spring member that is mounted to the base member, and a roller that is urged in an engagement direction with the internal teeth by the urging force of the plate spring member.

In the overload release mechanism that has the above configuration, if the rotation force of a predetermined value or more acts between the gear member and the base member, the roller crosses over the internal teeth of the gear member while elastically deforming the plate spring member, and relative rotation of the gear member and the base member is enabled. Thereby, when the excessive rotation force acts on the take-up shaft via the webbing, a power transmission path of the motor and the take-up shaft is cutout.

Meanwhile, in the webbing take-up device that has the above configuration, the gear member and the base member are disposed on the same axis as the take-up shaft, and the excessive rotation force that acts on the take-up shaft is directly input to the overload release mechanism. The roller and the plate spring member, that constitute the overload release mechanism, are held in the base member. When the overload release mechanism is operated, the internal teeth of the gear member and the roller slide in contact. In order to secure durability of the gear member, the gear member may need to be formed of a metal material. For this reason, a reduction gear and the like, that transmits the rotation force of the motor to the gear member, may need to be formed of a metal material, which results in increasing a manufacturing cost and weight of the device.

In the overload release mechanism that has the above configuration, a tip end of the plate spring member that is mounted to one of a motor-side rotation body and a take-up shaft-side rotation body may be directly engaged with ratchet teeth (internal teeth or external teeth) provided in the other. In this overload release mechanism, at the time of relative rotation of one of the motor-side rotation body and the take-up shaft-side rotation body with respect to the other (at the time of operating of the overload release mechanism), since an angular portion of the tip end of the plate spring member is slid with the ratchet teeth, it may be problem that durability of the ratchet teeth is deteriorated. Accordingly, the tip end side of the plate spring member is curved in an approximately C shape in side view and an outer circumferential surface (curved surface) of the curved portion is engaged with the ratchet teeth, thereby securing the durability of the ratchet teeth.

However, when the tip end side of the plate spring member is curved and the curved portion is formed, there is a limitation in decreasing radius of curvature thereof. For this reason, in order to sufficiently secure engagement allowance (maximum bending amount of the plate spring member) of the tip end side (curved portion) of the plate spring member and the ratchet teeth and apply a predetermined torque (so-called overload) to the relative rotation of one of the motor-side rotation body and the take-up shaft-side rotation body with respect to the other, the height of the ratchet teeth needs to be increased. For this reason, an outer diameter of the other (motor-side rotation body or the take-up shaft-side rotation body) that is provided with the ratchet teeth increases. As a result, the size of the overload release mechanism may radially increase.

SUMMARY OF THE INVENTION

Accordingly, the present invention has been made in consideration of the above circumferences and provides a webbing take-up device that uses a resin material to form a constituting member provided at the side of a motor with respect to a spring member of an overload release mechanism among members constituting a speed reduction mechanism that transmits rotation force of the motor to a take-up shaft.

Further, the invention provides a webbing take-up device that secures durability of ratchet teeth of an overload release mechanism, securely exercises overload, and radially decreases a size of the overload release mechanism.

To solve the problem, according to a first aspect of the invention, there is provided a webbing take-up device (a retractor), including: a take-up shaft that takes up a webbing for restraining a vehicle occupant; a motor; and a speed reduction mechanism that reduces a rotation speed of the motor, transmits rotation to the take-up shaft, and rotates the take-up shaft, the speed reduction mechanism including an overload release mechanism including: a motor-side rotation body that is rotated by rotation of the motor being transmitted thereto at the reduced rotation speed of the motor, a spring member that is mounted to the motor-side rotation body in such a manner that relative rotation with respect to the motor-side rotation body is disabled, and a take-up shaft-side rotation body that is provided to be coaxial and relatively rotatable with respect to the motor-side rotation body, that rotates the take-up shaft by rotation thereof being transmitted to the take-up shaft via at least one gear, that blocks relative rotation with respect to the motor-side rotation body by engaging with the spring member, and that allows relative rotation with respect to the motor-side rotation body by sliding with the spring member when a rotation force greater than or equal to a predetermined value acts between the motor-side rotation body and the take-up shaft-side rotation body.

In the webbing take-up apparatus according to the first aspect, the motor-side rotation body of the overload opening mechanism that is provided in the speed reduction mechanism is rotated by the rotation speed of the motor being reduced and the rotation (rotation force) being transmitted. The spring member is mounted to the motor-side rotation body, and the take-up shaft-side rotation body is engaged with the spring member. The spring member blocks the relative rotation of the take-up shaft-side rotation body with respect to the motor-side rotation body, and the take-up shaft-side rotation body rotates integrally with the motor-side rotation body in a normal state. The rotation of the take-up shaft-side rotation body is transmitted to the take-up shaft via at least one gear (one or more gears) and the take-up shaft is rotated. As a result, the webbing is taken up to the take-up shaft.

Meanwhile, if the excessive rotation force is input to the take-up shaft via the webbing, the rotation force of the take-up shaft is transmitted to the take-up shaft-side rotation body via the one or more gears, and the rotation force acts between the take-up shaft-side rotation body and the motor-side rotation body. If the rotation force becomes a predetermined value or more, the spring member that is mounted to the motor-side rotation body slides with the take-up shaft-side rotation body, and the relative rotation of the take-up shaft-side rotation body with respect to the motor-side rotation body is enabled. As a result, the take-up shaft can rotate independently from the motor.

In this case, in the webbing take-up device, when the take-up shaft-side rotation body rotates relatively with the motor-side rotation body, the motor-side rotation body and the spring member is not necessary to be made to slide, because the take-up shaft-side rotation body slides with respect to the spring member that is mounted to the motor-side rotation body. Accordingly, even when the motor-side rotation body is formed of a resin material, durability of the motor-side rotation body can be secured. As a result, the constituent members from the motor-side rotation body to the motor (that is, constituent members at the motor side with respect to the spring member of the overload release mechanism among the constituent members of the speed reduction mechanism) can be formed of a resin material.

That is, in the aspect, it is possible that the motor-side rotation body is made of a resin.

In the webbing take-up device according to a second aspect of the invention according to the first aspect, the motor-side rotation body includes a cylindrical portion that is formed in a cylindrical shape, the spring member includes a load receiving portion that extends in a circumferential direction of the cylindrical portion in a state where the load receiving portion abuts an inner circumferential surface of the cylindrical portion, and a deflection deformation portion that extends from at least one of two ends of the load receiving portion in an extending direction of the load receiving portion toward an inner side in a radial direction of the cylindrical portion, a tip end side of the deflection deformation portion engages with external teeth formed in an outer circumferential portion of the take-up shaft-side rotation body, and the deflection deformation portion is pushed by the external teeth to be deflect-deformed toward the side of the load receiving portion when the take-up shaft-side rotation body rotates relatively with respect to the motor-side rotation body.

According to the second aspect, the "load receiving portion that extends in the circumferential direction of the cylindrical portion" may extend along the circumferential direction of the cylindrical portion as a whole, and does not need to be formed in a circular arc shape that is concentric with the cylindrical portion. For example, even when the load receiving portion is bent and formed in an approximately U shape when viewed from the axial line direction of the cylindrical portion, it is sufficient if the shape of the inner circumferential portion of the cylindrical portion corresponds to the shape of the load receiving portion and a contact area of the inner circumferential surface of the cylindrical portion and the load receiving portion is widely secured.

In the webbing take-up device according to the second aspect, the tip end side of the deflection deformation portion of the spring member that is mounted to the motor-side rotation body is engaged with external teeth formed in the outer circumferential portion of the take-up shaft-side rotation body. As a result, the relative rotation of the take-up shaft-side rotation body with respect to the motor-side rotation body is blocked. When the rotation force of the predetermined value or more acts between the take-up shaft-side rotation body and the motor-side rotation body, the deflection deformation portion is pressed and pushed by the external teeth of the take-up shaft-side rotation body and is deflected and deformed toward the side of the load receiving portion of the spring member. As a result, the relative rotation of the take-up shaft-side rotation body with respect to the motor-side rotation body is allowed.

In this case, the load receiving portion of the spring member extends along the circumferential direction of the cylindrical portion of the motor-side rotation body and contacts (abuts) the inner circumferential surface of the cylindrical portion. For this reason, when the deflection deformation portion is deflected and deformed, the load receiving portion can be firmly supported in a wide range of the inner circumferential surface of the cylindrical portion. Thereby, the load receiving portion can be prevented or suppressed from being unnecessarily deflected and deformed. Accordingly, since the load (so-called overload) of when the take-up shaft-side rotation body rotates relatively with the motor-side rotation body can be set based on only the deformation load of the deflection deformation portion, the overload can be easily set.

Further, since the load that is input from the deflection deformation portion to the load receiving portion can be dispersed over a wide range of the inner circumferential surface of the cylindrical portion, the cylindrical portion can be suppressed from being deformed. Thereby, since the thickness of the cylindrical portion can be decreased, the size and weight of the motor-side rotation body can be decreased.

In the aspect, it is possible that the spring member includes a plurality of separated spring bodies each including the deflection deformation portion and the load receiving portion, and the motor-side rotation body is provided with a contact portion that abuts a side of the another end of the load receiving portion in the extending direction thereof.

In the webbing take-up device according to a third aspect of the invention according to the second aspect, the spring member is formed from a plate-like spring member, the spring member includes a base portion that is disposed in the cylindrical portion in a state where a plate thickness direction of the base portion is along an axial direction of the cylindrical portion, and the load receiving portion is connected to an outer circumferential portion of the base portion via a connecting portion, the connecting portion being bent such that a plate thickness direction of the load receiving portion is along the radial direction of the cylindrical portion.

In the webbing take-up device according to the third aspect, in the spring member that is formed by the plate-like spring member, the connecting portion of the base portion and the load receiving portion is bent. In a state where the spring member is mounted to the motor-side rotation body, a plate thickness direction of the base portion is along the axial line direction of the cylindrical portion, and a plate thickness direction of the load receiving portion is along the radial direction of the cylindrical portion.

Even when so-called springback is generated in the bent portion, a bent angle of the bent portion can be appropriately corrected, because the load receiving portion contacts (abuts) the inner circumferential surface of the cylindrical portion, in a state where the spring member is mounted to the motor-side rotation body. In this case, since the load receiving portion is pushed out to the inner circumferential surface of the cylindrical portion, the separation of the spring member from the motor-side rotation body can be prevented by the frictional force generated between the spring member and the motor-side rotation body.

In the aspect, it is possible that the spring member includes a plurality of spring bodies each including the deflection deformation portion and the load receiving portion, and each of the spring bodies is connected to the base portion via one of a plurality of connecting portions.

In the webbing take-up device according to a fourth aspect of the invention according to the third aspect, the deflection deformation portion extends from one end of the load receiving portion in the extending direction thereof, the connecting portion extends from the outer circumferential portion of the base portion toward an inner circumferential surface of the cylindrical portion, and is connected to another end of the load receiving portion in the extending direction thereof, and the motor-side rotation body is provided with a first contact portion that abuts the other end of the load receiving portion in the extending direction thereof in a circumferential direction of the cylindrical portion and a second contact portion that abuts the connecting portion at the same side as the first contact portion.

In the webbing take-up device according to the fourth aspect, the other end of the load receiving portion of the spring member in the extending direction contacts (abuts) the first contact portion that is provided in the motor-side rotation body. The connecting portion of the load receiving portion and the base portion extends from the outer circumferential portion of the base portion toward the inner circumferential surface of the cylindrical portion, and contacts (abuts) the second contact portion that is provided in the motor-side rotation body.

In this case, the first contact portion contacts the other end in the extending direction of the load receiving portion in the circumferential direction of the cylindrical portion. For this reason, the load in the rotation direction (circumferential direction of the cylindrical portion) that is input from the take-up shaft-side rotation body to the load receiving portion via the deflection deformation portion can be supported by the contact (abutting) of the other end of the load receiving portion in the extending direction and the first contact portion. Since the second contact portion contacts the connecting portion at the same side as the first contact portion, the load in the rotation direction that is input from the other end side of the load receiving portion in the extending direction to the connecting portion can be supported by the contact (abutting) of the connecting portion and the second contact portion. Thereby, since the load in the rotation direction can be dispersed to the two places of the first contact portion and the second contact portion, the size (strength) of the first contact portion can be decreased, the first contact portion and the second contact portion (motor-side rotation body) can be suppressed from being damaged, and the rotation force can be appropriately transmitted.

According to a webbing take-up device according to a fifth aspect, in the webbing take-up device according to the second aspect, the deflection deformation portions respectively extend from the two ends of the load receiving portion in the extending direction thereof, and the motor-side rotation body includes circumferential contact portions that abut base end sides of the deflection deformation portions in a circumferential direction of the cylindrical portion.

In the webbing take-up device according to the fifth aspect, the deflection deformation portions extends from the both ends in the extending direction of the load receiving portion of the spring member, and the tip end sides of the deflection deformation portions engage with the external teeth provided in the outer circumferential portion of the take-up shaft body-side rotation body.

In the motor-side rotation body, the circumferential contact portion that contacts (abuts) the base end side of the deflection deformation portion in the circumferential direction of the cylindrical portion is provided. For this reason, the load in the rotation direction (circumferential direction of the cylindrical portion) that is input from the take-up shaft-side rotation body to the tip end side of the deflection deformation portion can be supported by the contact (abutting) of the base end side of the deflection deformation portion and the circumferential contact portion. Since the deflection deformation portion extends toward the inner side in the radial direction of the cylindrical portion, a contact area of the base end side of the deflection deformation portion and the circumferential contact portion can be widely secured. As a result, since the load that is input to the circumferential contact portion (motor-side rotation body) can be dispersed, the motor-side rotation body can be suppressed from being damaged and the rotation force can be appropriately transmitted.

In the webbing take-up device according to a sixth aspect of the invention, there is provided a webbing take-up device (a retractor), including: a take-up shaft that takes up a webbing for restraining a vehicle occupant; a motor; and an overload release mechanism that is interposed between the take-up shaft and the motor, the overload release mechanism including a motor-side rotation body that is rotated by rotation of the motor being transmitted thereto, a take-up shaft-side rotation body provided to be coaxial and relatively rotatable with respect to the motor-side rotation body, that rotates in conjunction with (interlocking with) rotation of the take-up shaft, ratchet teeth that is provided in one of the motor-side rotation body or the take-up shaft-side rotation body, that protrude in a radial direction of the one of the motor-side rotation body or the take-up shaft-side rotation body, and a spring member mounted to the other of the motor-side rotation body or the take-up shaft-side rotation body, the spring member including a deflection deformation portion that blocks relative rotation of the one of the motor-side rotation body or the take-up shaft-side rotation body with respect to the other of the motor-side rotation body or the take-up shaft-side rotation body by a surface formed at a tip end of the deflection deformation portion abutting the ratchet teeth, and allows relative rotation of the one of the motor-side rotation body or the take-up shaft-side rotation body with respect to the other of the motor-side rotation body or the take-up shaft-side rotation body by the deflection deformation portion being deflected in the radial direction of the one of the motor-side rotation body or the take-up shaft-side rotation body and the surface passing over the ratchet teeth by mutual sliding between the surface and the ratchet teeth.

In the webbing take-up device according to the sixth aspect, the spring member is mounted to one of the motor-side rotation body or the take-up shaft-side rotation body of the overload release mechanism, and the deflection deformation portion is provided in the spring member. The surface is formed on the tip end of the deflection deformation portion, and the surface contacts (abuts) the ratchet teeth provided in the other of the motor-side rotation body or the take-up shaft-side rotation body. Thereby, the relative rotation of the motor-side rotation body and the take-up shaft-side rotation body is blocked. For this reason, when the motor-side rotation body is rotated by the motor, the take-up shaft-side rotation body is rotated, and the take-up shaft is rotated in linkage with the rotation of the take-up shaft-side rotation body. As a result, the webbing can be taken up to the take-up shaft.

During the taking-up of the webbing, if the rotation force is input to the take-up shaft via the webbing, the rotation force acts between the take-up shaft-side rotation body in linkage with the rotation of the take-up shaft and the motor-side rotation body, and the ratchet teeth and the tip end of the deflection deformation portion slide. By the sliding, if the deflection deformation portion is deflected in the radial direction of the one of the motor-side rotation body or the take-up shaft-side rotation body and crosses over the ratchet teeth, the relative rotation of the take-up shaft-side rotation body and the motor-side rotation body is allowed. Thereby, the take-up shaft can rotate independently from the motor.

In the webbing take-up device, as described above, since the surface that is formed on the tip end of the deflection deformation portion of the spring member slides with the ratchet teeth, durability of the ratchet teeth can be secured. If the height dimension of the ratchet teeth is set low, the allowable amount (that is, maximum deflected amount of the deflection deformation portion) of the deflection deformation portion and the ratchet teeth can be sufficiently secured, because the size of the "surface" can be sufficiently decreased according to the height. Accordingly, a function of the torque (so-called overload) of when the take-up shaft-side rotation body relatively rotates with respect to the motor-side rotation body can be securely realized, and the outer diameter dimension of the one of the take-up shaft-side rotation body or the motor-side rotation body including the height of the ratchet teeth can be decreased. Thereby, the size of the entire configuration of the overload release mechanism can be reduced.

In the aspect, it is possible that the surface is a curved surface formed on one side of the tip end in a circumferential direction of the other of the motor-side rotation body or the take-up shaft-side rotation body.

In the webbing take-up device according to a seventh aspect of the invention according to the first aspect, the motor-side rotation body includes a cylindrical portion that is formed in a cylindrical shape, the take-up shaft-side rotation body is disposed inside the cylindrical portion and includes a ratchet portion having the ratchet teeth formed at an outer circumferential portion, the spring member is mounted to the motor-side rotation body, and the deflection deformation portion extends from a side of an inner circumferential portion of the cylindrical portion toward a side of the ratchet portion.

In the webbing take-up device according to the seventh aspect, in the cylindrical portion of the motor-side rotation body, the ratchet portion of the take-up shaft-side rotation body that can rotate relatively with respect to the motor-side rotation body is disposed. The spring member is mounted to the motor-side rotation body, and the deflection deformation portion of the spring member extends from the inner circumferential portion side of the cylindrical portion of the motor-side rotation body toward the ratchet portion side. The ratchet teeth are formed in the outer circumferential portion of the ratchet portion, and the surface that is formed on the tip end of the deflection deformation portion contacts (abuts) the ratchet teeth.

In the webbing take-up device, as described above, the ratchet portion of the take-up shaft-side rotation body is disposed inside the cylindrical portion of the motor-side rotation body, and the ratchet teeth are formed in the outer circumferential portion of the ratchet portion that is formed to have a diameter smaller than that of the cylindrical portion. For this reason, the height of the ratchet teeth is preferably set low to correspond to the small-diameter ratchet portion. Here, in the aspect, even in the case of the above configuration, the allowable amount (that is, maximum deflected (deformed) amount of the deflection deformation portion) of the deflection deformation portion and the ratchet teeth can be sufficiently secured by setting the size of the "surface" to a small size.

As described above, in the webbing take-up device according to the aspects of the invention, the constituent member at the motor side with respect to the spring member of the overload release mechanism among the members constituting the speed reduction mechanism that transmits the rotation force of the motor to the take-up shaft can be formed of a resin material.

In the webbing take-up device according to the aspects of the invention, durability of the ratchet teeth of the overload release mechanism can be secured, the function of the overload can be securely realized, and the size of the overload release mechanism can be radially decreased.

BRIEF DESCRIPTION OF THE DRAWINGS

Embodiments of the present invention will be described in detail with reference to the following figures, wherein.

DETAILED DESCRIPTION OF THE INVENTION

<First Exemplary Embodiment>

Figure 1:
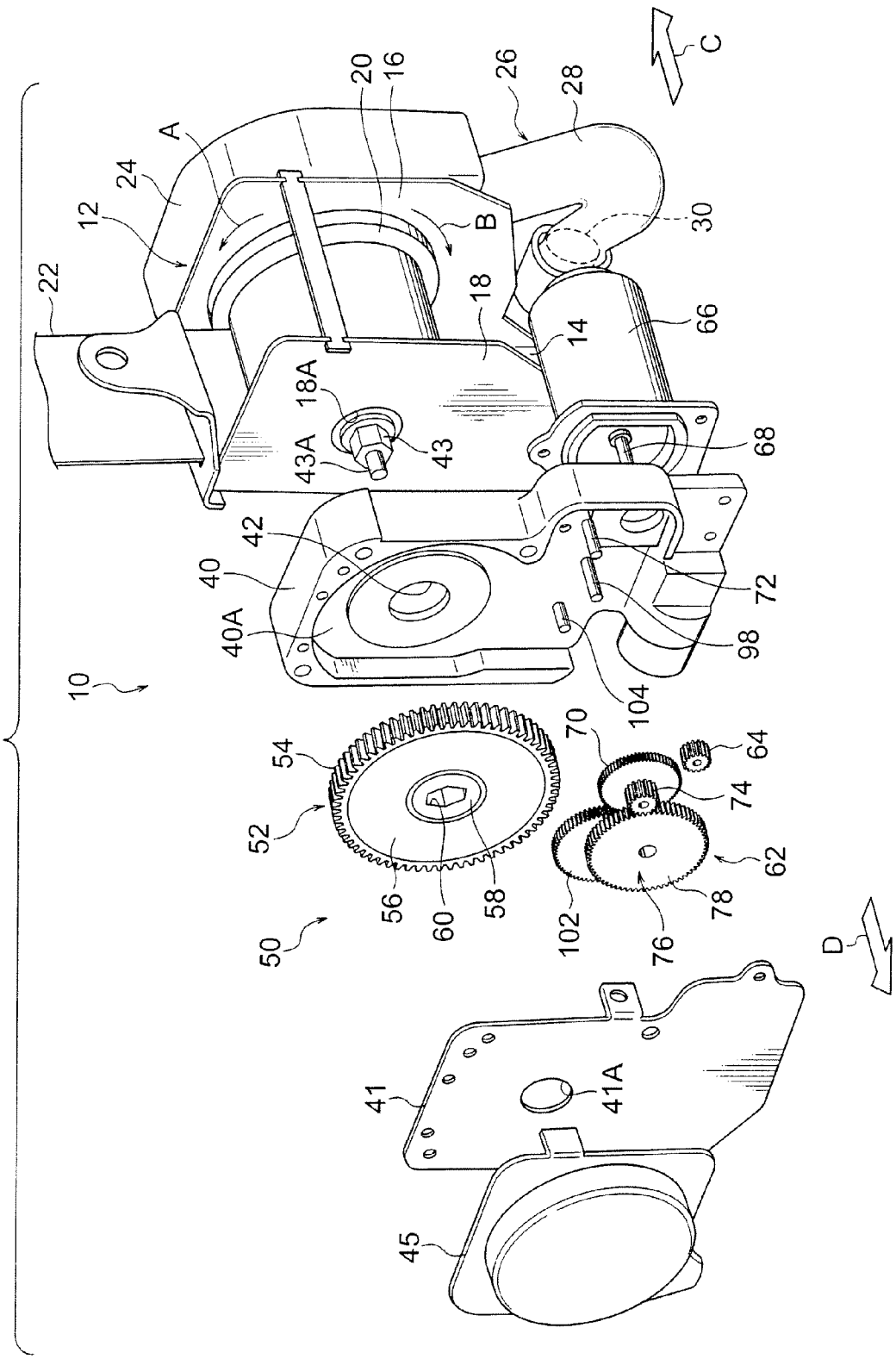
FIG. 1 is a schematic exploded perspective view illustrating the configuration of a webbing take-up device according to a first exemplary embodiment of the invention.

FIG. 1 is a schematic exploded perspective view of a webbing take-up device (a retractor) 10 according to a first exemplary embodiment of the present invention.

As illustrated in FIG. 1, the webbing take-up device 10 includes a frame 12. The frame 12 includes a plate-like back plate 14, and the back plate 14 is fixed to a vehicle body in the vicinity of a lower end of a center pillar of a vehicle by means of a fastening mechanism (not shown in the drawings), such as a bolt. As a result, the webbing take-up device 10 is mounted to the vehicle body. From both ends of the back plate 14 in a width direction thereof, a pair of leg plates (pieces) 16 and 18 that face each other extend parallel to each other in a substantially front and rear direction of the vehicle. A spool 20 (take-up shaft) that is formed in an approximately cylindrical shape is disposed between the leg plates 16 and 18.

In the spool 20, an axis line direction is along a facing direction of the leg plates 16 and 18. The spool 20 is rotatable around an axis line thereof. A base end of a webbing 22 having a long band-like shape in a longitudinal direction is connected to the spool 20. When the spool 20 rotates in a take-up direction (direction of an arrow A of FIG. 1) that is one direction about its axial line, the webbing 22 is taken up in layers on an outer circumferential portion of the spool 20 from its base end side. When the webbing 22 is pulled out from its tip end side, the webbing 22 that is taken up to the spool 20 is pulled our. Therefore, the spool 20 rotates in a pull-out direction (direction of an arrow B of FIG. 1) that is opposite to the take-up direction.

In the spool 20, a torsion shaft (not shown in the drawings) is disposed coaxially with respect to the spool 20. One end (one end at the side of the leg plate 18) of the torsion shaft in an axial line direction is connected to the spool 20 in such a manner that the relative rotation is disabled, and the other end thereof passes through a through-hole formed in the leg plate 16 and protrudes to the outside (side opposite to the spool 20 with respect to the leg plate 16, that is, side of an arrow C of FIG. 1) of the frame 12.

To the side opposite to the spool 20 of the leg plate 16, a sensor cover 24 made of a resin material is mounted. The sensor cover 24 is formed in a box-like shape where the side of the leg plate 16 (side of an arrow D of FIG. 1) is opened. The other end side of the torsion shaft in the axial line direction is inserted into the inside of the sensor cover 24, and is rotatably supported to a bearing portion (not shown in the drawings) provided in the sensor cover 24. Inside the sensor cover 24, a known locking mechanism (not shown in the drawings) is accommodated. The locking mechanism regulates the rotation of the torsion shaft in pull out direction, when rapid decelerating of the vehicle.

On the side opposite to the spool 20 of the leg plate 16, a pretensioner mechanism 26 is provided. The pretensioner mechanism 26 includes a cylinder 28 that is fixed to the leg plate 16, and a gas generator 30 is accommodated in a lower end of the cylinder 28. The gas generator 30 generates high-pressure gas in the cylinder 28, when an ignition device (not shown in the drawings) is operated. In the cylinder 28, a piston (not shown in the drawings) is accommodated. If the gas is generated in the cylinder 28, the piston protrudes from the cylinder 28 and compulsorily rotates the torsion shaft in the take-up direction.

Meanwhile, to the side opposite to the spool 20 of the leg plate 18 (side of the arrow D of FIG. 1), a clutch housing 40 that accommodates a speed reduction mechanism 50 (to be described in detail below) is mounted. The clutch housing 40 is formed in a box-like shape where the clutch housing is opened to the side opposite to the leg plate 18 (side of the arrow D of FIG. 1), using a metal material. An opening of the clutch housing 40 is closed by a cover 41 formed of a metal plate.

On a side wall portion 40A of the clutch housing 40, a cylindrical through-hole 42 is formed. The through-hole 42 is formed in a concentric with respect to the spool 20, and an adapter 43 that is formed in a hexagonal columnar shape using a metal material is disposed on the inside of the through-hole 42. The adapter 43 penetrates a through-hole 18A that is formed in the leg plate 18 and is coaxially fixed to the one end of the torsion shaft in the axial line direction. For this reason, the adapter 43 rotates integrally with the torsion shaft and the spool 20.

In the adapter 43, a columnar spindle portion 43A that protrudes to the side opposite to the spool 20 is coaxially and integrally provided. The spindle portion 43A penetrates a through-hole 41A that is formed in the cover 41 and protrudes to the outside of the clutch housing 40 (side opposite to the leg plate 18 with respect to the clutch housing 40, that is, side of the arrow D of FIG. 1).

On the side opposite to the leg plate 18 with respect to the clutch housing 40, a spring cover 45 made of a resin martial is provided. The spring cover 45 is formed in an approximately cylindrical shape having a bottom where the side of the leg plate 18 (side of the arrow C of FIG. 1) is opened, and is mounted to the leg plate 18 via the clutch housing 40. The spindle 43A of the adapter 43 is inserted into the spring cover 45, and the spindle 43A is rotatably supported by a bearing portion (not shown in the drawings) provided in the spring cover 45.

Inside the spring cover 45, a spiral spring (not shown in the drawings) is accommodated. In the spiral spring, an outer end in a spiral direction is connected to the spring cover 45 and an inner end in the spiral direction is connected to the spindle 43A. The spiral spring urges the spool 20 in the take-up direction via the adapter 43 and the torsion shaft.

Meanwhile, a clutch 52 that constitutes the speed reduction mechanism 50 is accommodated in the clutch housing 40. The clutch 52 includes a gear wheel 54. The gear wheel 54 is formed in a cylindrical shape having a bottom where the side of the cover 41 (side of the arrow D of FIG. 1) is opened and a dimension in the axial line direction is small. An opening of the gear wheel 54 is closed by the cover 56. In an outer circumferential portion of the gear wheel 54, external teeth are formed. The external teeth correspond to a reduction gear train 62 to be described in detail below.

In the gear wheel 54, a metallic ratchet wheel 58 where ratchet teeth (not shown in the drawings) are formed in an outer circumferential portion is provided to be coaxial and relatively rotate. In a shaft center portion of the ratchet wheel 58, a through-hole 60 having a section of a hexagonal shape is formed and the adapter 43 is fitted into the through-hole 60. Thereby, the ratchet wheel 58 is mounted to be coaxial and non-relatively-rotate with respect to the adapter 43, and rotates integrally with the torsion shaft (not shown in the drawings) and the spool 20.

On the outside of the ratchet wheel 58 in a radial direction, a pawl (not shown in the drawings) is provided. The pawl is generally held at a position away from the ratchet wheel 58 by means of the urging force of an urging member (not shown in the drawings). However, if the gear wheel 54 is rotated in the take-up direction (direction of the arrow A of FIG. 1), it engages (meshes) with the ratchet teeth of the ratchet wheel 58. In this mesh state, the relative rotation of the gear wheel 54 in the take-up direction with respect to the ratchet wheel 58 is regulated, and the ratchet wheel 58 rotates in the take-up direction integrally with the gear wheel 54. Thereby, the spool 20 that is connected to the ratchet wheel 58 via the adapter 43 and the torsion shaft rotates in the take-up direction. If the gear wheel 54 is rotated in the pull out direction (direction of the arrow B of FIG. 1), the mash state of the pawl with the ratchet wheel 58 is released, and a connection state of the spool 20 and the gear wheel 54 is released.

Meanwhile, inside the clutch housing 40, a reduction gear train 62 that constitutes a speed reduction mechanism 50 is accommodated. The reduction gear train 62 includes a gear 64 of spur teeth formed of a resin material. The gear 64 is accommodated inside the clutch housing 40 in a state where the axial line direction is along the axial line direction of the spool 20.

The gear 64 is fixed to an output shaft 68 of the motor 66 which is mounted at the clutch housing 40. On the side of the gear 64 in the radial direction, a gear 70 that is formed of a resin material is disposed. The gear 70 is formed to have a diameter larger than that of the gear 64. In the clutch housing 40, a support shaft 72 is formed to correspond to the gear 70. In the support shaft 72, the axial line direction is along the axial line direction of the spool 20, and the gear 70 is rotatably supported to the support shaft 72, in a state where the gear 70 meshes with the gear 64.

On one side of the gear 70 in the axial line direction (side of the arrow D of FIG. 1), a gear 74 of spur teeth that has a diameter smaller than that of the gear 70 is provided. The gear 74 is formed integrally with the gear 70 using a resin material and is disposed coaxially with respect to the gear 70. On the side of the gear 74 in the radial direction, a gear 78 (motor-side rotation body) that has a diameter larger than that of the gear 74 is provided. The large-diameter gear 78 is formed of a resin material and constitutes the overload release mechanism 76 (refers to FIGS. 2 and 3). In FIG. 1, the overload release mechanism 76 is simplified-illustrated.

Figure 2:
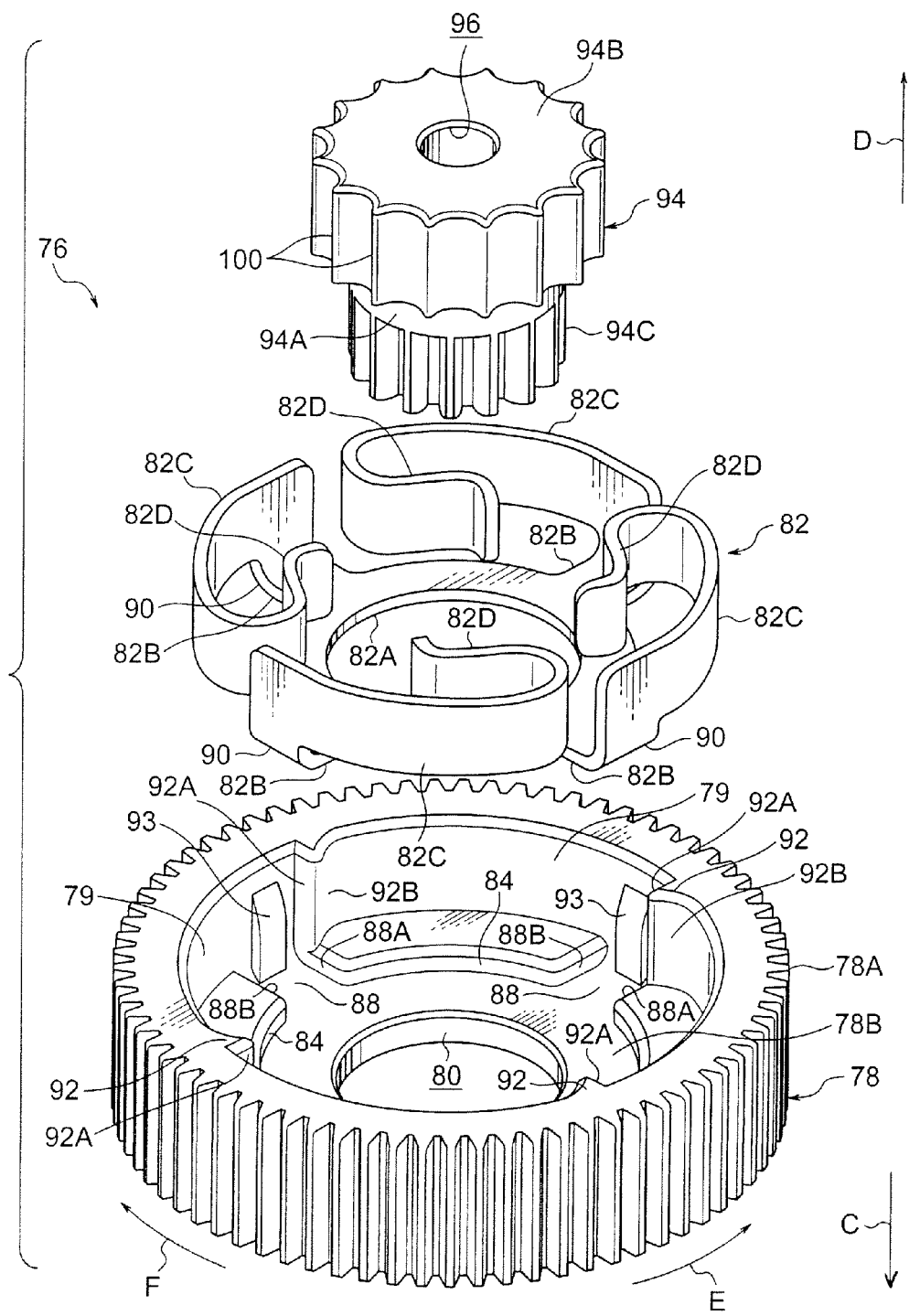
FIG. 2 is an exploded perspective view illustrating the configuration of an overload release mechanism that is a member constituting the webbing take-up device according to the first exemplary embodiment of the invention.
Figure 3:
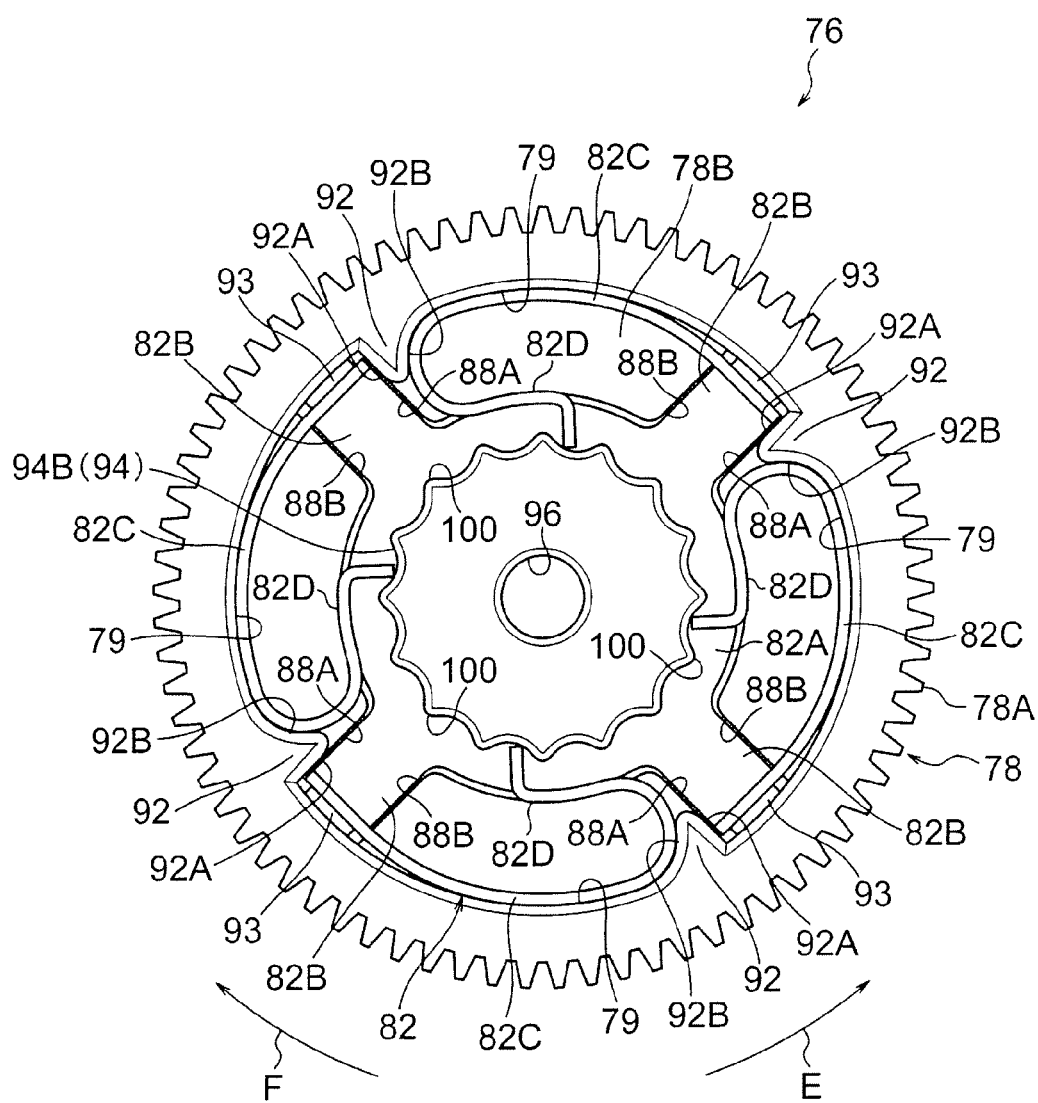
FIG. 3 is a plan view illustrating an overload release mechanism illustrated in FIG. 2.

As illustrated in FIGS. 2 and 3, the large-diameter gear 78 has a cylindrical portion 78A that is formed in a cylindrical shape (ring shape) and a bottom wall portion 78B that is provided on one end (end at the side of the arrow C in FIG. 2) of the cylindrical portion 78A in the axial line direction, and is formed in a cylindrical shape having a bottom where a dimension in the axial line direction is short. In an outer circumferential portion of the cylindrical portion 78A, external teeth of spur teeth are formed. In a central portion of the bottom wall portion 78B, a circular through-hole 80 that is concentric with the cylindrical portion 78A is formed.

Inside the cylindrical portion 78A, a spring member 82 that constitutes the overload release mechanism 76 is provided. The spring member 82 is formed from a spring member having a plate shape, and includes a base portion 82A that is formed in a ring shape. The base member 82A contacts the bottom wall portion 78B in a state where a plate thickness direction is along the axial line direction of the cylindrical portion 78A.

In the bottom wall portion 78B, a stepped portion 84 including an inner circumferential surface that forms a concentric shape with the cylindrical portion 78A is formed, and a dimension of a central portion in the axial line direction is thin (small). An inner diameter of the stepped portion 84 is almost equal to an outer diameter of the base portion 82A. The base portion 82A is held in a concentric manner with the cylindrical portion 78A by an outer circumferential portion thereof abutting the stepped portion 84.

In the bottom wall portion 78B, plural (four in the first exemplary embodiment) groove portions 88 that extend from the stepped portion 84 to an inner circumferential surface 79 of the cylindrical portion 78A are formed. These groove portions 88 are disposed at an equivalent interval in a circumferential direction of the bottom wall portion 78B. Theses groove portions 88 correspond to plural (four in the first exemplary embodiment) connecting portions 82B that are provided in the spring member 82.

Each connecting portion 82B extends integrally to the outside of the radial direction of the base portion 82A from the outer circumferential portion of the base portion 82A, and is fitted into the each of the groove portions 88 of the bottom wall portion 78B. On a tip end side of each connecting portion 82B, a bent portion 90 having an L shape when viewed from the circumferential direction of the cylindrical portion 78A is formed, and a tip end of each connecting portion 82B protrudes to the other end side of the axial line direction of the cylindrical portion 78A (side of the arrow D of FIG. 2). From each of the tip ends of the connecting portions 82B, a load receiving portion 82C extends integrally to one side of the circumferential direction of the cylindrical portion 78A (side of the arrow E of FIGS. 2 and 3).

The load receiving portions 82C are formed integrally with the connecting portions 82B and the base portion 82A. The bent portion 90 is provided on the tip end side of each connecting portion 82B, and the load receiving portion 82C is disposed such that a plate thickness direction is along the radial direction of the cylindrical portion 78A. The load receiving portion 82C is formed in a long plate shape along the circumferential direction of the cylindrical portion 78A, and is curved such that an outer circumferential surface thereof abut (contact closely to) an inner circumferential surface 79 of the cylindrical portion 78A.

From one end (end at the side of the arrow E in FIGS. 2 and 3) of each load receiving portion 82C in an extending direction, a deflection deformation portion (a flexible deformation portion) 82D integrally extends. As illustrated in FIG. 3, each deflection deformation portion 82D is formed to be curved in an approximately S shape in plan view, and the base end side that is connected to the one end of each load receiving portion 82C in the extending direction is curved in a circular arc shape (approximately U shape). A middle portion of each deflection deformation portion 82D extends to the other end side of each load receiving portion 82C in the extending direction (side where each load receiving portion 82C is connected to each connecting portion 82B). Tip end side of each deflection deformation portion 82D is bent to the inner side of the radial direction of the cylindrical portion 78A. The deflection deformation portion 82D corresponds to a small-diameter gear 94 (take-up shaft-side rotation body) to be descried in detail below.

Meanwhile, on inner circumference of the cylindrical portion 78A of the large-diameter gear 78, plural (four in the first exemplary embodiment) rotation stopping portions 92 that protrude to the inner side of the radial direction of the cylindrical portion 78A are provided. In the rotation stopping portion 92, a surface that faces one side (side of the arrow E of FIGS. 2 and 3) in the circumferential direction of the cylindrical portion 78A is a first contact portion 92A, and the first contact portion 92A faces to be able to contact (abut) the other end (end at the side of the arrow F of FIGS. 2 and 3) of each load receiving portion 82C in the extending direction.

Each first contact portion 92A is connected (continuous) to one side face (a second contact portion 88A) of each of the plural groove portions 88 mentioned above, and each second contact portion 88A faces to be able to contact (abut) each connecting portion 82B at the same side as the first contact portion 92A. Thereby, the relative rotation of the spring member 82 toward the other side (side of the arrow F of FIGS. 2 and 3) of the circumferential direction with respect to the large-diameter gear 78 is regulated. The other side (a third contact portion 88B) of each of the plural groove portions 88 faces to be able to contact each connecting portion 82B at the side opposite to the second contact portion 88A. Thereby, the relative rotation of the spring member 82 toward the one side (side of the arrow E of FIGS. 2 and 3) of the circumferential direction with respect to the large-diameter gear 78 is regulated. In each of the plural rotation stopping portions 92, the opposite side of the first contact portion 92A is a curved surface portion 92B having a curved surface shape, and a slight gap is provided such that each load receiving portion 82C enters between the first contact portion 92A and the curved surface portion 92B.

In the inner circumferential portion of the cylindrical portion 78A, a collapsible rib 93 that protrudes to the inner side of the radial direction of the cylindrical portion 78A is provided in a portion facing an outer circumferential surface of the other end side of the extending direction of each load receiving portion 82C. The collapsible rib 93 is pushed out to the outer circumferential surface of the other end side of the extending direction of each load receiving portion 82C, in a state where the spring member 82 is mounted to the large-diameter gear 78. Thereby, the spring member 82 is mounted to the large-diameter gear 78 without rattling and the spring member 82 may be prevented from being separated from the large-diameter gear 78.

Meanwhile, the overload release mechanism 76 includes the small-diameter gear 94 (take-up shaft-side rotation body) that is formed of a metal material. The small-diameter gear 94 is formed in a columnar shape where a diameter is smaller than that of the large-diameter gear 78. A spindle portion 94A that is provided in a middle portion in an axial line direction is fitted into the through-hole 80 formed in the bottom wall portion 78B of the large-diameter gear 78, and is supported so as to be able to relatively rotate with respect to the large-diameter gear 78.

In an axis center portion of the small-diameter gear 94, a cylindrical through-hole 96 is formed. In the through-hole 96, a support shaft 98 that is provided in the clutch housing 40 is inserted. An axial line direction of the support shaft 98 is along the axial line direction of the spool 20, and the small-diameter gear 94 is rotatably supported to the support shaft 98. The support shaft 98 is rotatably supported to the large-diameter gear 78 via the small-diameter gear 94, and external teeth of the large-diameter gear 78 meshes with the gear 74.

On one side (side of the arrow D of FIG. 2) of the small-diameter gear 94 in the axial line direction, a ratchet portion 94B that has a diameter larger than that of the spindle 94A is provided. The ratchet portion 94B is accommodated inside the cylindrical portion 78A. In an outer circumferential portion of the ratchet portion 94B, plural wavy ratchet teeth 100 are formed, and tip ends of the deflection deformation portions 82D of the spring member 82 abut or contact (engage with) valley portions of the ratchet teeth 100. For this reason, by the ratchet teeth 100 interfering with the plural deflection deformation portions 82D, the relative rotation of the small-diameter gear 94 with respect to the large-diameter gear 78 is blocked (stopped).

However, if the rotation force of a predetermined value or more acts between the small-diameter gear 94 and the large-diameter gear 78, the plural deflection deformation portions 82D of the spring member 82 are pressed and pushed by the ratchet teeth 100 and are deflected and deformed to the side of the load receiving portion 82C (the inner circumferential side of the cylindrical portion 78A), so the relative rotation of the small-diameter gear 94 with respect to the large-diameter gear 78 is allowed (overload release mechanism 76 is activated). In this case, the tip end of the deflection deformation portion 82D crosses over each ratchet tooth 100 while sliding with the plural ratchet teeth 100.

In the first exemplary embodiment, the shape of the spring member 82 is set such that the small-diameter gear 94 relatively rotates in a direction of the arrow F of FIGS. 2 and 3 with respect to the large-diameter gear 78 when the overload release mechanism 76 is activated.

Meanwhile, on the other end side (side of the arrow C of FIG. 2) of the small-diameter gear 94 in the axial line direction, a gear portion 94C where external teeth of spur teeth are formed in an outer circumferential portion is provided. The gear portion 94C protrudes toward one side of the large-diameter gear 78 in the axial line direction (side of the arrow C of FIG. 2), and a gear 102 (refer to FIG. 1) of spur teeth that has a diameter larger than that of the small-diameter gear 94 is disposed on the side in the radial direction of the small-diameter gear 94. The gear 102 is formed of a metal material. In the clutch housing 40, a support shaft 104 is formed to correspond to the gear 102. An axial line direction of the support shaft 104 is along the axial line direction of the spool 20, and the gear 102 is rotatably supported to the support shaft 104 in a state where the gear meshes with the gear portion 94C of the small-diameter gear 94.

On one side (side of the arrow C of FIG. 1) of the gear 102 in the axial line direction, a gear of spur teeth (not shown in the drawings) is coaxially and integrally formed. The gear meshes with the gear wheel 54 of the clutch 52 mentioned above. Thereby, the rotation force of the output shaft 68 of the motor 66 is transmitted to the gear wheel 54 via the reduction gear train 62.

When the motor 66 forward rotates the output shaft 68, the large-diameter gear 78 and the small-diameter gear 94 of the overload release mechanism 76 rotate in one direction (direction of the arrow E of FIGS. 2 and 3) about the axial line, and the gear wheel 54 is rotated in the take-up direction (direction of the arrow A of FIG. 1). When the motor 66 backward (reversely) rotates the output shaft 68, the large-diameter gear 78 and the small-diameter gear 94 of the overload release mechanism 76 rotate in the other direction (direction of the arrow F of FIGS. 2 and 3) about the axial line, and the gear wheel 54 is rotated in the pull out direction (direction of the arrow B of FIG. 1).

Next, an operation of the first exemplary embodiment will be described.

In the webbing take-up device 10, for example, if a control unit (not shown in the drawings) such as a ECU determines that a distance, from the vehicle to an obstacle such as another vehicle moved or stopped at the front of the vehicle where the webbing take-up device 10 is mounted, becomes less than a predetermined value, on the basis of a detection result of a front monitoring unit (not shown in the drawings), such as a radar distance-measure device or an infrared distance-measure device, the control unit forward rotates the motor 66.

If the output shaft 68 is forward rotated by the forward rotation driving force of the motor 66, the rotation force of the output shaft 68 is transmitted to the large-diameter gear 78 of the overload release mechanism 76 via the gears 64, 70, and 74, and the large-diameter gear 78 rotates in one direction (direction of the arrow E of FIGS. 2 and 3) about the axial line. The rotation of the large-diameter gear 78 is transmitted to the small-diameter gear 94 via the spring member 82, and the small-diameter gear 94 rotates in one direction (direction of the arrow E of FIGS. 2 and 3) about the axial line. The rotation of the small-diameter gear 94 is transmitted to the gear wheel 54 of the clutch 52 via the gear 102 and a gear (not shown in the drawings) provided coaxially and integrally with the gear 102, and the gear wheel 54 is rotated in the take-up direction (direction of the arrow A of FIG. 1).

If the gear wheel 54 rotates in the take-up direction, a pawl (not shown in the drawings) that is mounted to the gear wheel 54 meshes with the ratchet wheel 58, so the relative rotation of the gear wheel 54 in the take-up direction with respect to the ratchet wheel 58 is regulated. In this state, if the gear wheel 54 further rotates in the take-up direction, the ratchet wheel 58 together with the gear wheel 54 rotate in the take-up direction.

Since the ratchet wheel 58 is connected to the spool 20 via the adapter 43 and the torsion shaft, the ratchet wheel 58 rotates in the take-up direction so the spool 20 rotates in the take-up direction, and the webbing 22 is taken up to the spool 20 from the base end side thereof in the longitudinal direction. Thereby, slightly loosened state of the webbing 22 that is mounted to a body of an occupant, so-called "slack" is removed (resolved), and constraint of the occupant by the webbing 22 is improved.

Meanwhile, as described above, in a state where the webbing 22 is taken up, if the excessive pull out force acts on the webbing 22 by the inertial force of the occupant, the rotation force of the pull out direction (direction of the arrow B of FIG. 1) is input to the spool 20 via the webbing 22. The rotation force of the pull out direction is transmitted to the small-diameter gear 94 of the overload release mechanism 76 via the gear wheel 54 of the clutch 52, a gear (not shown in the drawings) meshed with the gear wheel 54, and the gear 102 provided coaxially and integrally with the gear, and the rotation force of the direction of the arrow F of FIGS. 2 and 3 is applied to the small-diameter gear 94.

At this time, since the large-diameter gear 78 rotates in the direction of the arrow E of FIGS. 2 and 3 by the driving force of the motor 66, the relative rotation force acts between the small-diameter gear 94 and the large-diameter gear 78. If the rotation force becomes the predetermined value or more, each deflection deformation portion 82D of the spring member 82 that is mounted to the large-diameter gear 78 is pressed and pushed by the ratchet teeth 100 of the small-diameter gear 94 and is deflected and deformed to the side of each load receiving portion 82C. As a result, the relative rotation of the small-diameter gear 94 with respect to the large-diameter gear 78 is allowed. In this case, the small-diameter gear 94, while the outer circumference (ratchet teeth 100) of the ratchet portion 94B sliding with the tip ends of the plural deflection deformation portions 82D, relatively rotates in the direction of the arrow F of FIGS. 2 and 3 with respect to the large-diameter gear 78. Thereby, the spool 20 rotates in the pull out direction independently from the motor 66, and the transmission of the rotation force from the motor 66 to the spool 20 is stopped.

Here, in the webbing take-up device 10, the overload release mechanism 76 is disposed at the middle position of the speed reduction mechanism 50, and the rotation speed of the small-diameter gear 94 is reduced and the rotation force is transmitted to the spool 20. Therefore, as described above, when the excessive rotation force acts on the spool 20, the rotation force mentioned above is reduced by an amount corresponding to a reduction ratio from the spool 20 to the small-diameter gear 94 and is transmitted to the small-diameter gear 94. Accordingly, the load that is input from the small-diameter gear 94 via the spring member 82 to the large-diameter gear 78 can be reduced. Further, when the small-diameter gear 94 relatively rotates with respect to the large-diameter gear 78, the small-diameter gear 94 slides with respect to the spring member 82 that is mounted to the large-diameter gear 78, therefore, it is not necessary that the large-diameter gear 78 and the spring member 82 are not slid. Accordingly, even though the large-diameter gear 78 is formed of a resin material, durability of the large-diameter gear 78 can be secured. Thereby, the constituent members from the large-diameter gear 78 to the motor 66, that is, the constituent members at the side of the motor 66 than the spring member 82 of the overload release mechanism 76 among the constituent members of the speed reduction mechanism 50 (the large-diameter gear 78 and the gears 74, 70, and 64) can be formed of a resin material.

In the webbing take-up device 10, the plural load receiving portions 82C that are provided in the spring member 82 extend along the circumferential direction in the cylindrical portion 78A of the large-diameter gear 78 and contact the inner circumferential surface 79 of the cylindrical portion 78A. For this reason, when each deflection deformation portion 82D is deflected and deformed, each load receiving portion 82C can be firmly supported in a wide range of the inner circumferential surface of the cylindrical portion 78A. Thereby, each load receiving portion 82C may be prevented or suppressed from being unnecessarily deflected and deformed. Accordingly, since the load (so-called overload) of when the small-diameter gear 94 relatively rotates with respect to the large-diameter gear 78 can be set by only the deformation load of each deflection deformation portion 82D, the overload can be easily set.

In the webbing take-up device 10, since the load that is input from each deflection deformation portion 82D to each load receiving portion 82C can be dispersed over a wide range of the inner circumferential surface 79 of the cylindrical portion 78A, the deformation of the cylindrical portion 78A may be suppressed. Thereby, since the thickness of the cylindrical portion 78A can be reduced, the size and weight of the large-diameter gear 78 can be reduced.

In the webbing take-up device 10, even when so-called springback is generated in the plural bent portions 90 provided in the spring member 82, each load receiving portion 82C contacts (contacts in pressure) the inner circumferential surface 79 of the cylindrical portion 78A, in a state where the spring member 82 is mounted to the large-diameter gear 78. Therefore, a bent angle of each bent portion 90 can be appropriately corrected. In this case, since each load receiving portion 82C is pushed out to the inner circumferential surface 79 of the cylindrical portion 78A, the separation of the spring member 82 from the large-diameter gear 78 can be prevented by the frictional force generated between the spring member 82 and the large-diameter gear 78.

In the webbing take-up device 10, the load in the rotation direction (load directed to the direction of the arrow F in FIGS. 2 and 3) that is input from each deflection deformation portion 82D to each load receiving portion 82C at the time of the relative rotation of the small-diameter gear 94 and the large-diameter gear 78 is supported by the contact of the other end of each load receiving portion 82C in the extending direction and each first contact portion 92A, and is supported by the contact of each connecting portion 82B and each second contact portion 88A. Thereby, since the load in the rotation direction is dispersed into two places of the first contact portion 92A and the second contact portion 88A, the size (strength) of the first contact portion 92A can be reduced, the first contact portion 92A and the second contact portion 88A (large-diameter gear 78) can be suppressed from being damaged, and the rotation force can be appropriately transmitted.

Next, other exemplary embodiments of the invention will be described. In other exemplary embodiments, the description of the same configuration and function as those of the first exemplary embodiment may be omitted while the same reference numerals as those of the first exemplary embodiment are used.

<Second Exemplary Embodiment>

Figure 4:
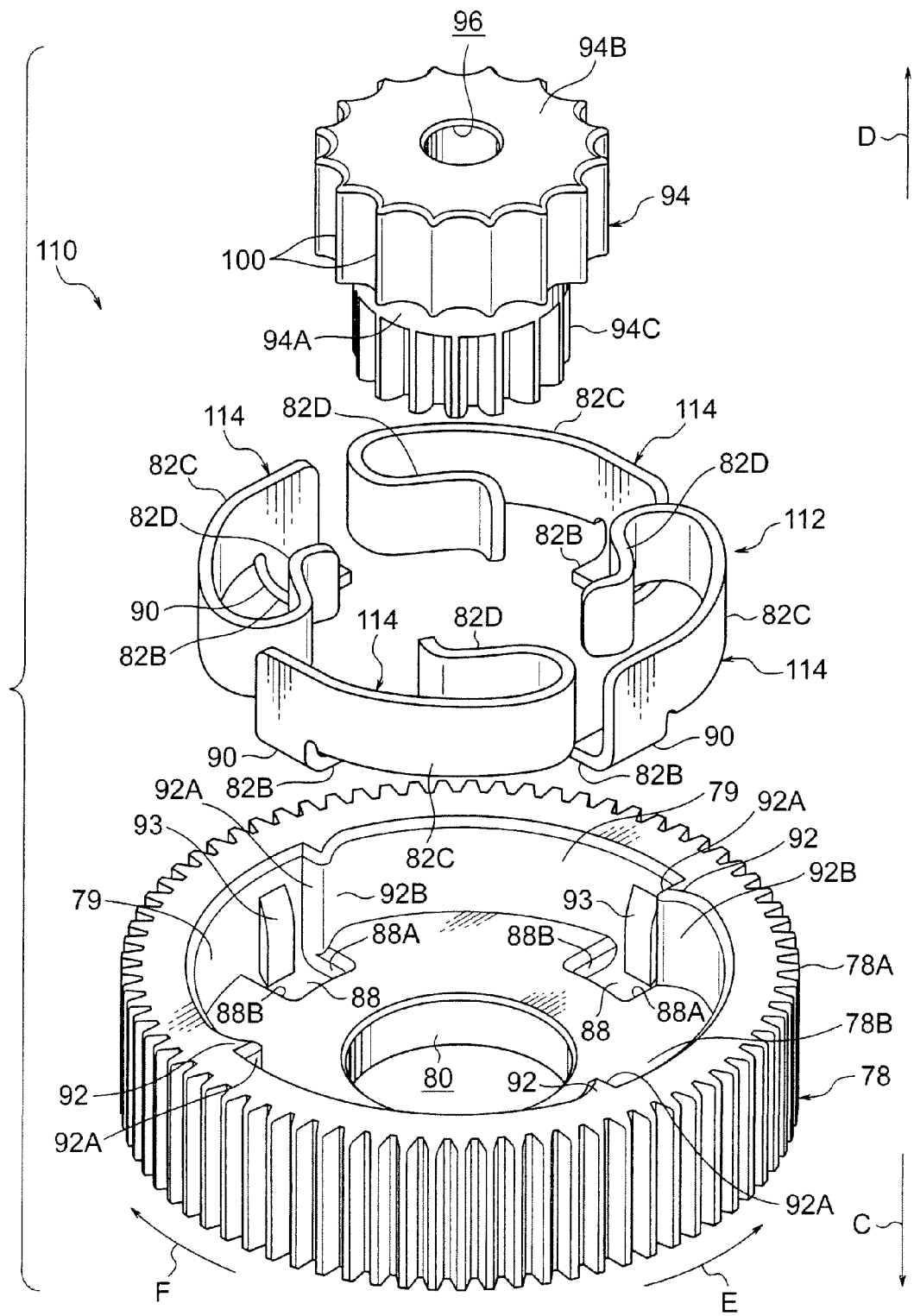
FIG. 4 is an exploded perspective view illustrating the configuration of an overload release mechanism that is a member constituting the webbing take-up device according to the second exemplary embodiment of the invention.

FIG. 4 is an exploded perspective view of the configuration of an overload release mechanism 110 that is a member constituting a webbing take-up device according to a second exemplary embodiment of the invention. The overload release mechanism 110 has similar configuration as that of the overload release mechanism 76 according to the first exemplary embodiment, except that the configuration of a spring member 112 is different from that of the spring member 82 according to the first exemplary embodiment.

The spring member 112 basically has similar configuration as that of the spring member 82 according to the first exemplary embodiment, however, different from the spring member 82 according to the first exemplary embodiment, the spring member 112 is not provided with the base member 82A according to the first exemplary embodiment and is configured by plural (four in the second exemplary embodiment) spring bodies 114 including a connecting portion 82B, a load receiving portion 82C, and a deflection deformation portion 82D.

In the overload release mechanism 110, the stepped portion 84 of the large-diameter gear 78 is omitted, and each spring body 114 is mounted to the large-diameter gear 78 in a state where the connecting portion 82B is fitted into the groove portion 88.

In the overload release mechanism 110 that has the above configuration, the load receiving portion 82C of each spring body 114 contacts the inner circumferential surface 79 of the cylindrical portion 78A of the large-diameter gear 78. When each deflection deformation portion 82D is deflected and deformed (when the small-diameter gear 94 and the large-diameter gear 78 relatively rotate), each load receiving portion 82C is firmly supported in a wide range of the inner circumferential surface of the cylindrical portion 78A.

The load in the rotation direction (load directed to the direction of the arrow F in FIG. 4) that is input from each deflection deformation portion 82D to each load receiving portion 82C at the time of the relative rotation of the small-diameter gear 94 and the large-diameter gear 78 is supported by the contact of the other end of each load receiving portion 82C in the extending direction and each first contact portion 92A, and is supported by the contact of each connecting portion 82B and each second contact portion 88A.

Therefore, in the exemplary embodiment, the same operation and effect as those of the first exemplary embodiment may be achieved.

<Third Exemplary Embodiment>

Figure 5:
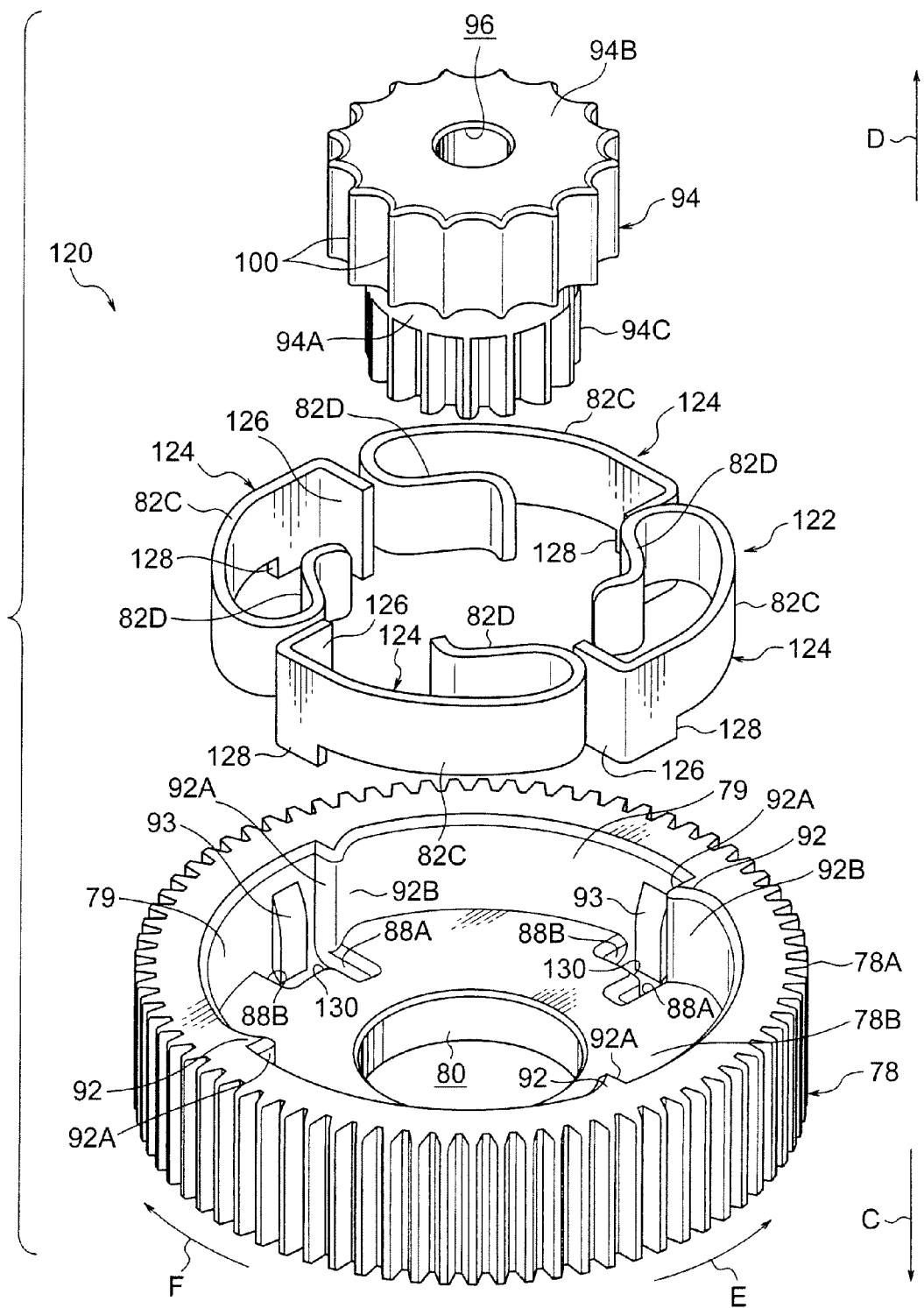
FIG. 5 is an exploded perspective view illustrating the configuration of an overload release mechanism that is a member constituting the webbing take-up device according to the third exemplary embodiment of the invention.

FIG. 5 is an exploded perspective view of the configuration of an overload release mechanism 120 that is a member constituting a webbing take-up device according to a third exemplary embodiment of the invention. The overload release mechanism 120 has similar configuration as that of the overload release mechanism 76 according to the first exemplary embodiment, except that the configuration of a spring member 122 is different from that of the spring member 82 according to the first exemplary embodiment.

The spring member 122 basically has similar configuration as that of the spring member 82 according to the first exemplary embodiment, however, different from the spring member 82 according to the first exemplary embodiment, the spring member 122 is not provided with the base member 82A according to the first exemplary embodiment and is configured by plural (four in the third exemplary embodiment) spring bodies 124. Each spring body 124 includes a load receiving portion 82C and a deflection deformation portion 82D, and a stopper portion 126 extends, from the other end (end at the side of the arrow F in FIG. 5) of the load receiving portion 82C in the extending direction, to the inside in the radial direction of the large-diameter gear 78.

On the other end side (side of the arrow F of FIG. 5) of the load receiving portion 82C in the extending direction, an inserting portion 128 that protrudes to the side of the bottom wall portion 78B of the large-diameter gear 78 is provided. When ends of the inserting portion 128 and the stopper portion 126 are inserted into an L-shaped groove portion 130 formed in the large-diameter gear 78, each spring body 124 is mounted to the large-diameter gear 78. In the overload release mechanism 110, the stepped portion 84 of the large-diameter gear 78 is omitted.

In the overload release mechanism 120 that has the above configuration, the load receiving portion 82C of each spring body 124 contacts the inner circumferential surface 79 of the cylindrical portion 78A of the large-diameter gear 78. When each deflection deformation portion 82D is deflected and deformed (when the small-diameter gear 94 and the large-diameter gear 78 relatively rotate), each load receiving portion 82C is firmly supported in a wide range of the inner circumferential surface of the cylindrical portion 78A.

The load in the rotation direction (load directed to the direction of the arrow F in FIG. 5) that is input from each deflection deformation portion 82D to each load receiving portion 82C at the time of the relative rotation of the small-diameter gear 94 and the large-diameter gear 78 is supported by the contact of the stopper 126 and the first and second contact portions 92A and 88A.

Therefore, in the exemplary embodiment, the same operation and effect as those of the first exemplary embodiment may be achieved.

<Fourth Exemplary Embodiment>

Figure 6:
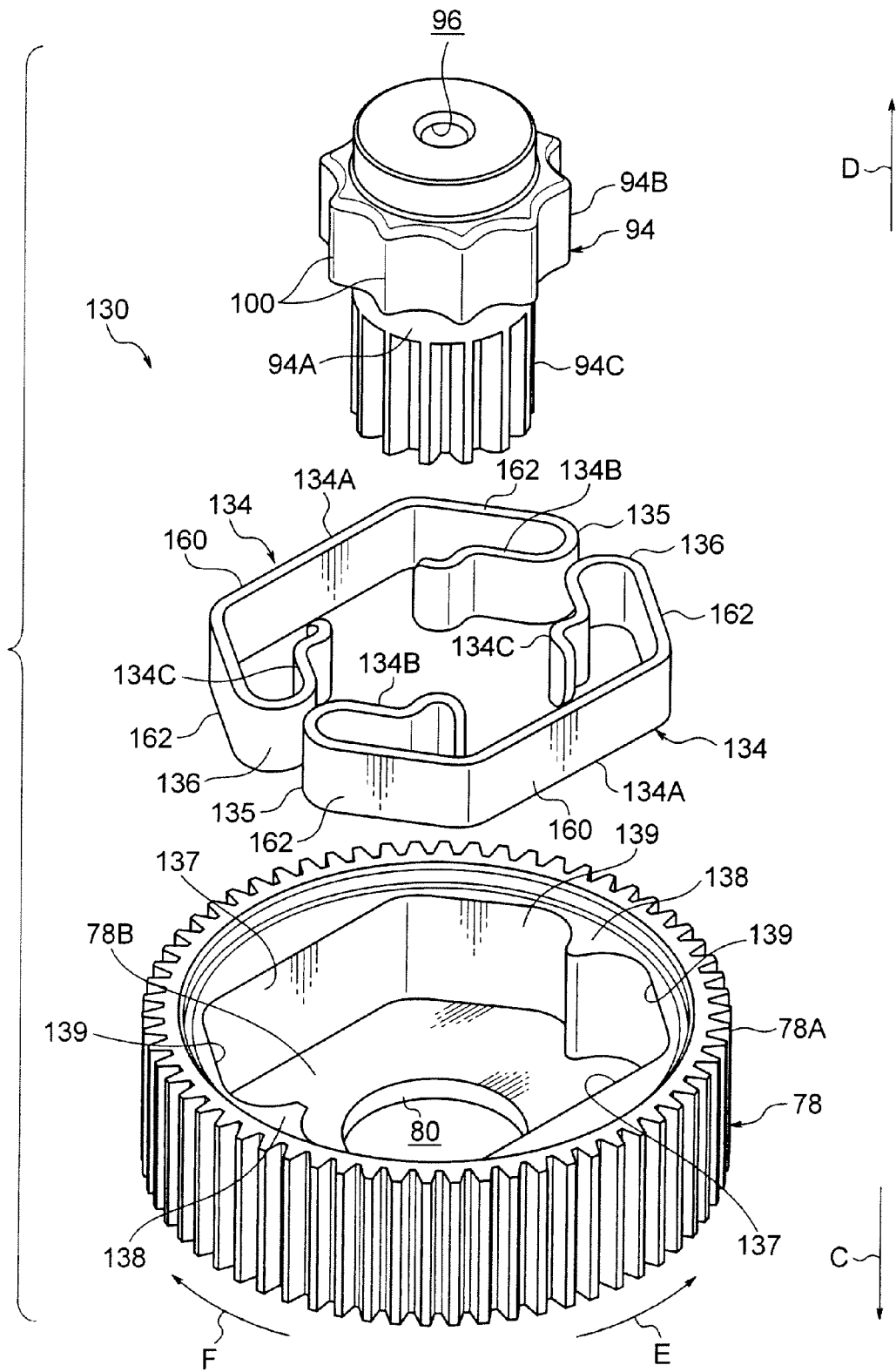
FIG. 6 is an exploded perspective view illustrating the configuration of an overload release mechanism that is a member constituting the webbing take-up device according to the fourth exemplary embodiment of the invention.

FIG. 6 is an exploded perspective view of the configuration of an overload release mechanism 130 that is a member constituting a webbing take-up device according to a fourth exemplary embodiment of the invention. The overload release mechanism 130 has similar configuration as that of the overload release mechanism 76 according to the first exemplary embodiment, except that the configuration of a spring member 132 is different from that of the spring member 82 according to the first exemplary embodiment.

The spring member 132 is configured by plural (two in the forth exemplary embodiment) spring bodies 134. Each spring body 134 is formed of a plate-like spring member, and has a load receiving portion 134A that is bent in an approximately U shape and a pair of deflection deformation portions 134B and 134C that integrally extend in a direction close to each other from both ends of the load receiving portion 134A. The load receiving portion 134A is formed to be expanded to the side of the opening and has a middle portion 160 and a pair of arm portions 162 that are provided on both sides of the middle portion 160. The pair of deflection deformation portions 134B and 134C have similar configuration as that of the deflection deformation portion 82D according to the first exemplary embodiment, and are provided with curved portions 135 and 136 curved in a circular arc shape at the individual base end sides (sides connected to the arm portions 162 of the load receiving portion 134A). However, tip end sides of the deflection deformation portions 134B and 134C are curved in an S shape, and portions of the deflection deformation portions that contact the ratchet portion 94B of the small-diameter gear 94 are formed in a curved surface shape.

The spring bodies 134 are mounted in the inside of the cylindrical portion 78A of the large-diameter gear 78 in a state where the opening sides (the deflection deformation portions 134B and 134C sides) of the load receiving portions 134A face each other. An inner circumferential surface of the cylindrical portion 78A is formed in an approximately hexagonal shape when viewed from the axial line direction of the cylindrical portion 78A, and includes intermediate contact surfaces 137 that contact the respective intermediate portions 160 of the load receiving portions 134A, and end-side contact surfaces 139 that face the respective arm portions 162. Between each end-side contact surface 139 and each arm portion 162, a slight gap is secured in a normal state.

In the mounting state, the load receiving portion 134A extends along the circumferential direction of the cylindrical portion 78A, and the tip end sides of the deflection deformation portions 134B and 134C that extend from both ends in the extending direction of the load receiving portion 134A to the inner side in the radial direction of the cylindrical portion 78A contact the ratchet portion 94B of the small-diameter gear 94.

In the large-diameter gear 78, a pair of circumferential contact portions 138 that protrude from the inner circumferential surface of the cylindrical portion 78A to the inner side in the radial direction of the cylindrical portion 78A are provided. The circumferential contact portions 138 are each disposed between the curved portion 135 of one spring body 134 and the curved portion 136 of the other spring body 134. The shape of the surface of the circumferential contact portions 138 is set to contact (closely contact to) the outer circumferential surfaces of the curved portions 135 and 136 in the circumferential direction of the cylindrical portion 78.

In the overload release mechanism 130 that has the above configuration, as described above, the intermediate portion 160 of the load receiving portion 134A of each spring body 134 contacts the intermediate contact surface 137 of the cylindrical portion 78A of the large-diameter gear 78. The arm portion 162 of the load receiving portion 134A faces the end-side contact surface 139 of the cylindrical portion 78A with a slight gap. For this reason, when the deflection deformation portions 134B and 134C are deflected and deformed (when the small-diameter gear 94 and the large-diameter gear 78 relatively rotate), the arm portion 162 of the load receiving portion 134A contacts the end-side contact surface 139 and is firmly supported, and the middle portion 160 of the load receiving portion 134A is firmly supported by the intermediate contact surface 137. Therefore, since the load receiving portion 134A is firmly supported in a wide range of the inner circumferential surface of the cylindrical portion 78A, the same operation and effect as those of the first exemplary embodiment can be achieved even in the fourth exemplary embodiment.

In the overload release mechanism 130, when the small-diameter gear 94 relatively rotates in the direction of the arrow F of FIG. 6 with respect to the large-diameter gear 78 (when the overload release mechanism 130 is activated), the load in the rotation direction (load directed to the direction of the arrow F in FIG. 6) that is input from the small-diameter gear 94 to the tip end side of the deflection deformation portions 134B and 134C of the individual spring bodies 134 is supported by the contact of the base end side of one deflection deformation portion 134B (the curved portion 135) and the circumferential contact portion 138. In this case, since the deflection deformation portion 134B extends to the inner side in the radial direction of the cylindrical portion 78, a large contact area of the base end side of the deflection deformation portion 134B (the curved portion 135) and the circumferential contact portion 138 can be secured. Thereby, since the load that is input to the circumferential contact portion 138 (large-diameter gear 78) can be dispersed, the large-diameter gear 78 can be suppressed from being damaged, and the rotation force can be appropriately transmitted.

In the overload release mechanism 130, since each spring body 134 is formed in an approximately U shape and contacts the inner circumferential surface of the cylindrical portion 78 having an approximately hexagonal shape, these shapes serve to function of stopping of rotation of each spring body 134. Thereby, since the load in the rotation direction input to the tip end side of the deflection deformation portions 134B and 134C is dispersed to the inner circumferential surface of the cylindrical portion 78 (the intermediate contact surface 137 and the end-side contact surface 139), the large-diameter gear 78 can be further effectively suppressed from being damaged.

In the fourth exemplary embodiment, the load receiving portion 134A is formed to be bent in an approximately U shape, but the invention is not limited thereto. The shape of the load receiving portion 134A may be appropriately changed. For example, the load receiving portion 134A may be formed in a circular arc shape that forms a concentric shape with the cylindrical portion 78.

<Fifth Exemplary Embodiment>

Figure 8:
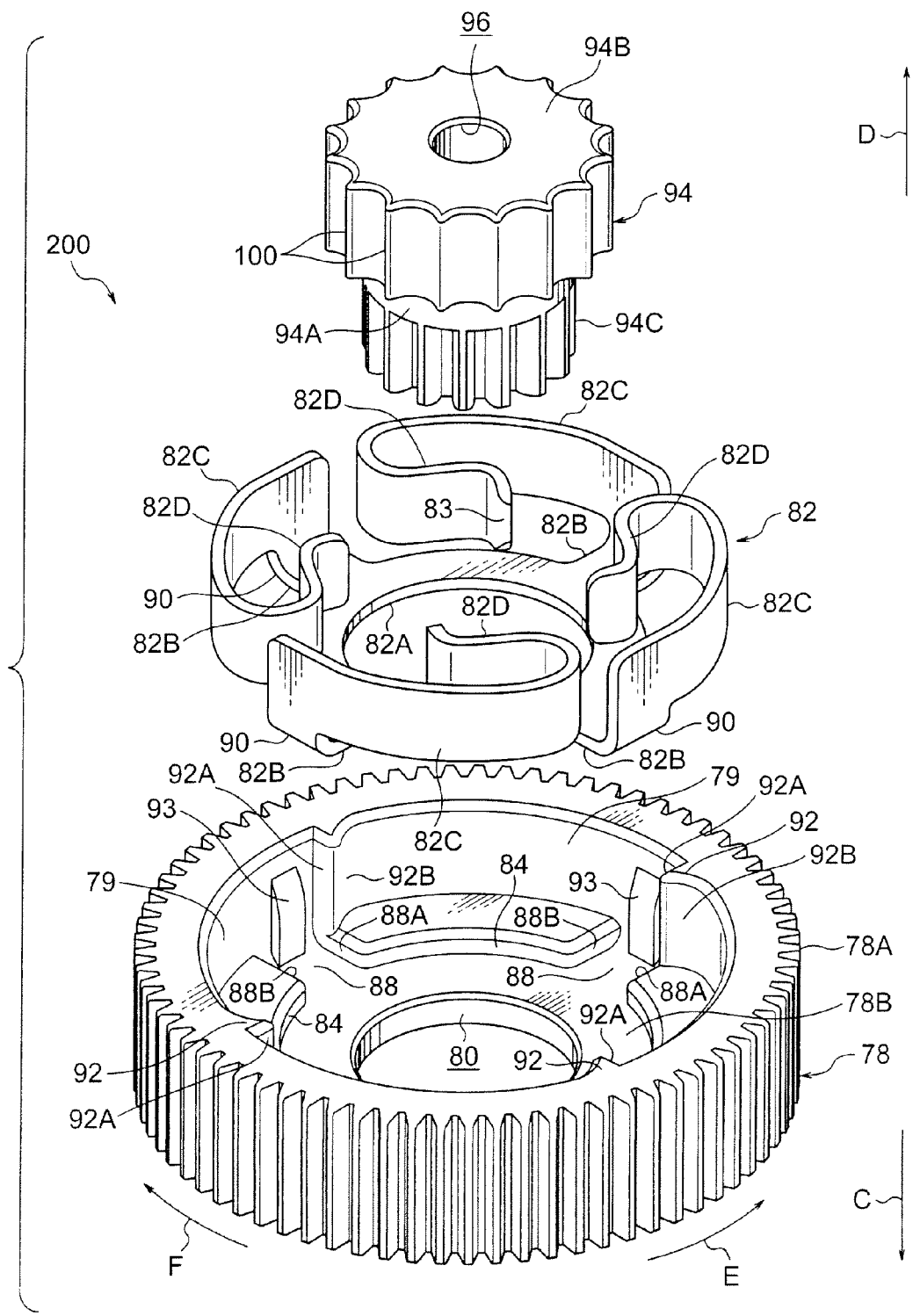
FIG. 8 is an exploded perspective view illustrating the configuration of an overload release mechanism that is a member constituting a webbing take-up device according to a fifth exemplary embodiment of the invention.

FIG. 8 is an exploded perspective view of the configuration of an overload release mechanism 200 that is a member constituting a webbing take-up device according to a fifth exemplary embodiment of the invention. The configuration of the overload release mechanism 200 is similar to that of the overload release mechanism 76 according to the first exemplary embodiment.

In the exemplary embodiment, the gear wheel 54 is formed of a metal material, further, the spring member 82 is formed by pressing forming on the spring member having a plate shape.

Figure 9:
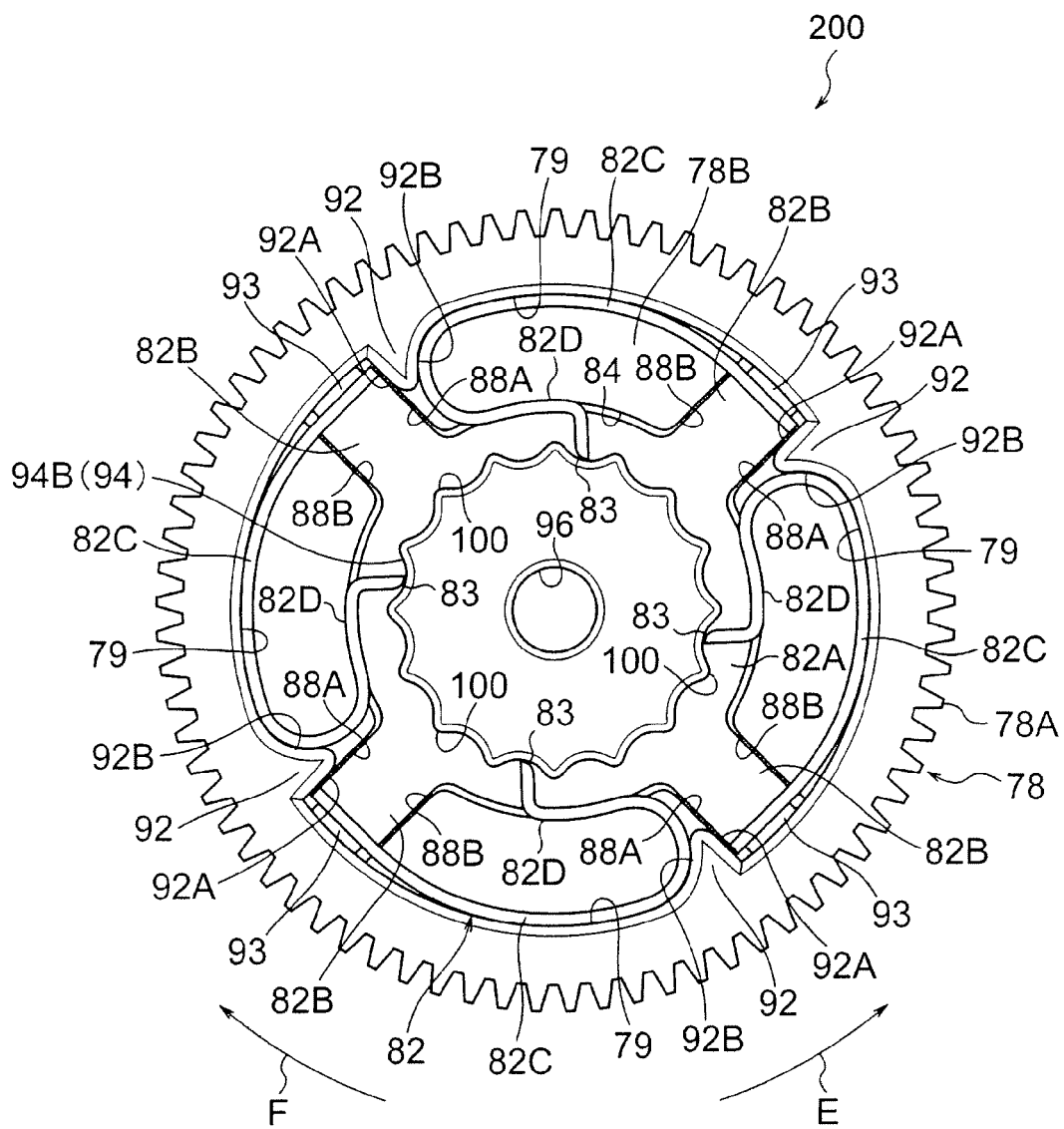
FIG. 9 is a plan view illustrating the overload release mechanism illustrated in FIG. 8.

As illustrated in FIG. 9, each deflection deformation portion 82D is formed to be curved in an approximately S shape in plan view, and a base end side that is connected to one end of each load receiving portion 82C in the extending direction is curved in a circular arc shape (approximately C shape).

In the plural rotation stopping portions 92, the opposite side of the first contact portion 92A is a curved surface portion 92B having a curved surface shape, and one end (end at the side of the arrow E in FIGS. 8 and 9) of each load receiving portion 82C in the extending direction contacts (closely contact to) the curved surface portion 92B.

Figure 10:
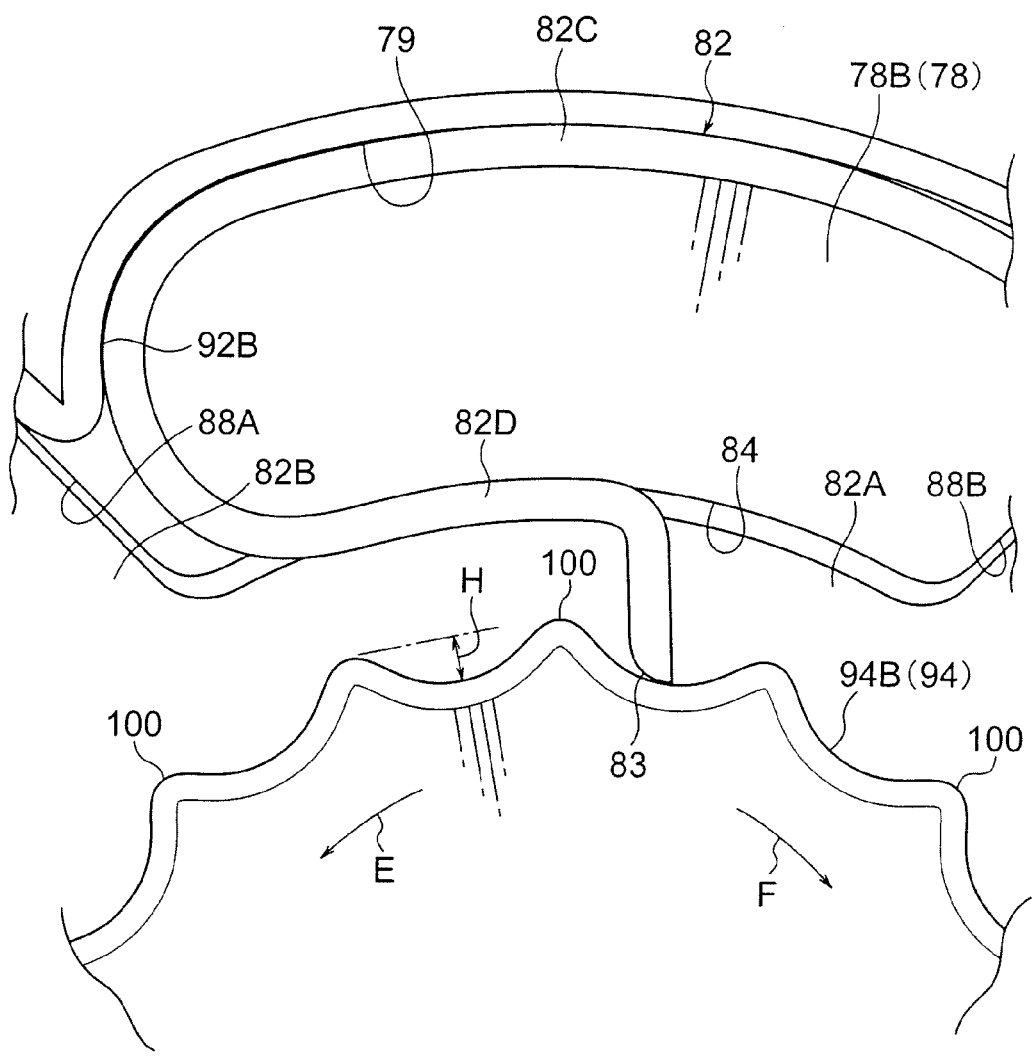
FIG. 10 is an enlarged view of a portion of FIG. 9, which illustrates a relationship between a deflection deformation portion of a spring member and ratchet teeth of a small-diameter gear.

In the outer circumferential portion of the ratchet portion 94B, plural wavy ratchet teeth 100 are formed, and tip ends of the plural deflection deformation portions 82D of the spring member 182 contact the outer circumference of the ratchet portion 94B (portions between the adjacent ratchet teeth 100) (refer to FIG. 10). For this reason, the tip ends of the plural deflection deformation portions 82D abut the ratchet teeth 100 in the circumferential direction of the small-diameter gear 94 so the relative rotation of the small-diameter gear 94 with respect to the large-diameter gear 78 is blocked (stopped).

Figure 11:
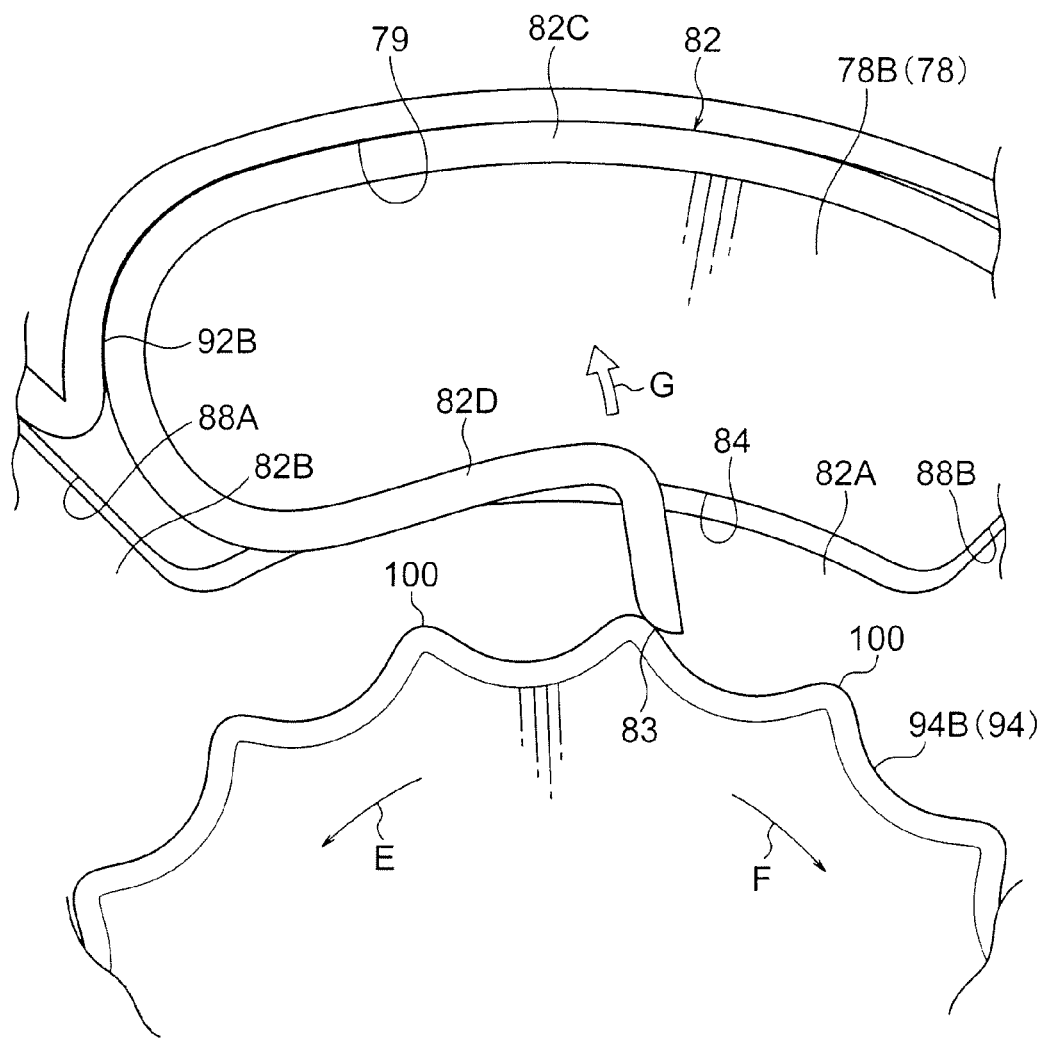
FIG. 11 is an enlarged view corresponding to FIG. 10, which illustrates a state where a bent surface formed in a tip end of the deflection deformation portion and the ratchet teeth slide and the deflection deformation portion is bent.

However, if the rotation force of a predetermined value or more acts between the small-diameter gear 94 and the large-diameter gear 78, as illustrated in FIG. 11, the plural deflection deformation portions 82D of the spring member 182 are pressed and pushed by the ratchet teeth 100 and are deflected and deformed to the side of the load receiving portion 82C (inner circumferential side of the cylindrical portion 78A) (refer to the arrow G of FIG. 11), and the relative rotation of the small-diameter gear 94 with respect to the large-diameter gear 78 is allowed (overload release mechanism 200 is activated). In this case, the tip end of the individual deflection deformation portions 82D crosses over each ratchet tooth 100 while sliding with the ratchet tooth 100.

In the exemplary embodiment, in the tip end of each deflection deformation portion 82D, a curved surface 83 is formed, and the curved surface 83 contacts the outer circumference (ratchet teeth 100) of the ratchet portion 94B. When the spring member 182 is subjected to press molding (forming), the curved surface 83 is formed by performing surface press working on the tip end of each deflection deformation portion 82D, and the curvature center extends along the axis line direction of the ratchet portion 94B (small-diameter gear 94).

In the exemplary embodiment, the shape of the spring member 182 is set such that the small-diameter gear 94 relatively rotates in a direction of the arrow F of FIGS. 8 and 9 with respect to the large-diameter gear 78 when the overload release mechanism 200 is activated. Each curved surface 83 is formed on one side (side of the arrow E of FIGS. 8 and 9) of the tip end of each deflection deformation portion 82D. For this reason, when the small-diameter gear 94 is relatively rotated in the direction of the arrow F of FIGS. 8 and 9 with respect to the large-diameter gear 78, each curved surface 83 slides with the ratchet teeth 100, so the component force that is directed to the outer side in the radial direction of the ratchet portion 94B is input to each curved surface 83. Thereby, each deflection deformation portion 82D is deflected and deformed to the side of the load receiving portion 82C.

The "surface" that is formed on the tip end of each deflection deformation portion 82D is not limited to the curved surface 83, and may be a "C surface" formed by C chamfering. An "end face" of the tip end of each deflection deformation portion 82D may be configured to contact the outer circumference (ratchet teeth 100) of the ratchet portion 94B, without performing special working such as surface press working on the tip end of each deflection deformation portion. That is, the "surface" that is formed on the tip end of each deflection deformation portion 82D may be formed without performing bending working on the tip end side of each deflection deformation portion 82D.

Even in the exemplary embodiment, the same operation and effect as those of the first exemplary embodiment is achieved. In a state where the webbing 22 is taken up, if the excessive extraction force acts on the webbing 22 by the inertial force of the occupant, the rotation force of the pull out direction (direction of the arrow B of FIG. 1) is input to the spool 20 via the webbing 22. The rotation force of the pull out direction is transmitted to the small-diameter gear 94 of the overload release mechanism 200 via the gear wheel 54 of the clutch 52, a gear (not shown in the drawings) meshed with the gear wheel 54, and the gear 102 provided coaxially and integrally with the gear, and the rotation force of the direction of the arrow F of FIGS. 8 and 9 is applied to the small-diameter gear 94.

At this time, since the large-diameter gear 78 rotates in the direction of the arrow E of FIGS. 8 and 9 by the driving force of the motor 66, the relative rotation force acts between the small-diameter gear 94 and the large-diameter gear 78. If this rotation force becomes a predetermined value or more, the curved surfaces 83 that are formed on the tip ends of the plural deflection deformation portions 82D of the spring member 182 slide with the ratchet teeth 100 of the small-diameter gear 94, and the component force that is directed to the outer side of the radial direction of the small-diameter gear 94 is input to the curved surface 83 of each deflection deformation portion 82D. Thereby, each deflection deformation portion 82D is deflected (deformed) to the side of each load receiving portion 82C and crosses over the ratchet teeth 100, and the small-diameter gear 94 relatively rotates with respect to the large-diameter gear 78 in the direction of the arrow F of FIGS. 8 and 9 (overload release mechanism 200 is activated).

Thereby, the spool 20 is able to rotate in the pull out direction independently from the motor 66, and the transmission of the rotation force from the motor 66 to the spool 20 is stopped.

In the webbing take-up device 10, as described above, since the curved surface 83 that is formed in the tip end of the deflection deformation portion 82D of the spring member 182 slides with the ratchet teeth 100, durability of the ratchet teeth 100 can be secured.

Since the curved surface 83 is formed by the surface press working, the curvature radius can be freely set. Accordingly, even when a height H of the ratchet teeth 100 is set low, the curvature radius of the curved surface 83 can be sufficiently decreased according to the height H, and allowable amount (that is, maximum deflected (deformed) amount of the deflection deformation portion 82D) of the deflection deformation portion 82D and the ratchet teeth 100 can be sufficiently secured.

That is, in the webbing take-up device 10, the ratchet portion 94B of the small-diameter gear 94 is disposed inside the cylindrical portion 78A of the large-diameter gear 78, and the ratchet teeth 100 are formed in the outer circumferential portion of the ratchet portion 94B that is formed to have a diameter smaller than that of the cylindrical portion 78A. For this reason, the height H of the ratchet teeth 100 is set low so as to correspond to the small-diameter ratchet portion 94B. However, even in the case of the above configuration, by the curvature radius of the curved surface 83 being set low, the allowable amount of the deflection deformation portion 82D and the ratchet teeth 100 can be sufficiently secured.

Accordingly, a function of the torque (so-called overload) of when the small-diameter gear 94 relatively rotates with respect to the large-diameter gear 78 can be maximally realized, and the outer diameter dimension of the small-diameter gear 94 including the height H of the ratchet teeth 100 can be decreased. Thereby, the size of the entire configuration of the overload release mechanism 200 can be reduced.

In the exemplary embodiment, the spring member 182 that is mounted to the large-diameter gear 78 engages with the ratchet teeth 100 that are formed in the outer circumferential portion of the small-diameter gear 94. However, the spring member 182 that is mounted to the small-diameter gear 94 may engage with the ratchet teeth that are formed in the inner circumferential portion of the large-diameter gear 78.

In the exemplary embodiment, the spring member 182 includes the base portion 82A, the connecting portion 82B, and the load receiving portion 82C in addition to the deflection deformation portion 82D. However, the configuration of the spring member 182 may be appropriately changed.

Figure 7:
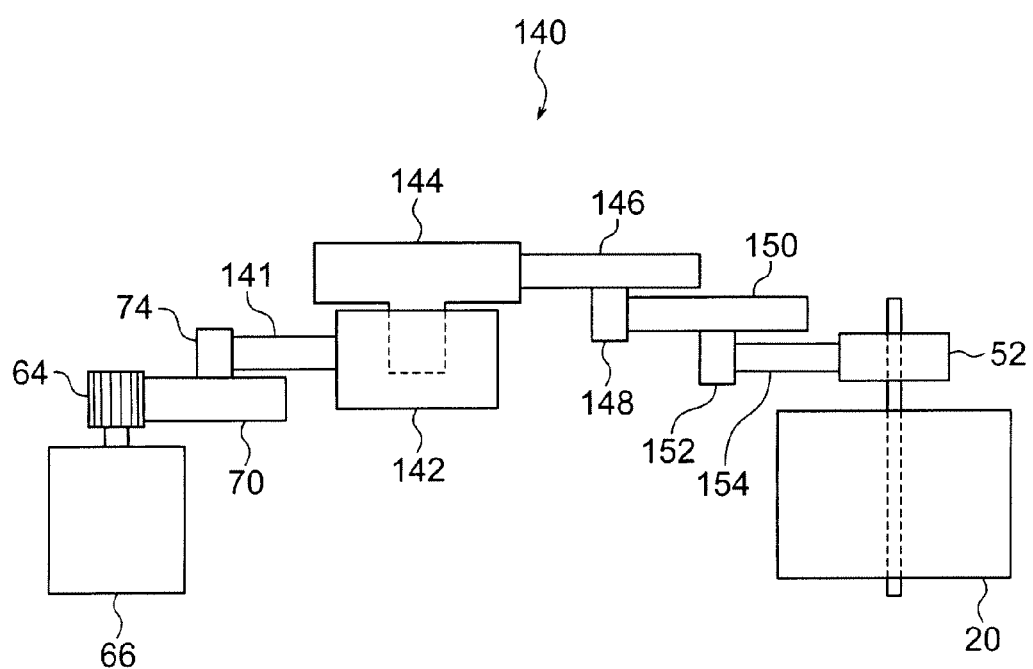
FIG. 7 is a diagram illustrating a modification of a speed reduction mechanism according to the first to fourth exemplary embodiments of the invention.

In the speed reduction mechanisms 50 according to the individual exemplary embodiments, the rotation speed of the small-diameter gear 94 (take-up shaft-side rotation body) is reduced and the rotation force is transmitted to the take-up shaft 20, but the invention is not limited thereto. For example, the speed reduction mechanism 50 may be configured as a speed reduction mechanism 140 illustrated in FIG. 7. In the speed reduction mechanism 140, the rotation force of the motor 66 is transmitted to the gear 142 (motor-side rotation body) via the gears 64, 70, 74, and 141, and the gear 142 rotates. The rotation of the gear 142 is transmitted to the gear 144 (take-up shaft-side rotation body) via a spring member (not shown in the drawings) mounted to the gear 142. The rotation of the gear 144 is transmitted to the take-up shaft 20 via the gears 146, 148, 150, 152, and 154 and the gear wheel 54 of the clutch 52, and the take-up shaft 20 rotates.

In the case of the speed reduction mechanism 140, the gears 64, 70, 74, and 141 reduce the rotation speed of the motor 66 and transmit the rotation force to the gear 142

(motor-side rotation body). However, the gears 146, 148, 150, 152, and 154 and the gear wheel 54 increase the rotation speed of the gear 144 (take-up shaft-side rotation body) (or maintain the rotation speed at the same speed) and transmit the rotation force to the take-up shaft 20. As a whole, the rotation speed of the motor 66 is reduced and the rotation force is transmitted to the take-up shaft 20.

What is claimed is:

1. A webbing take-up device, comprising:
   a take-up shaft that takes up a webbing for restraining a vehicle occupant;
   a motor; and
   a speed reduction mechanism that reduces a rotation speed of the motor, transmits rotation to the take-up shaft, and rotates the take-up shaft, the speed reduction mechanism including an overload release mechanism including:
   a motor-side rotation body that is rotated by rotation of the motor being transmitted thereto at the reduced rotation speed of the motor,
   a spring member that is fixedly mounted to the motor-side rotation body in such a manner that relative rotation between the spring member and the motor-side rotation body is prevented, and
   a take-up shaft-side rotation body that is provided to be coaxial and relatively rotatable with respect to the motor-side rotation body, that rotates the take-up shaft by rotation thereof being transmitted to the take-up shaft via at least one gear, that engages with the spring member to prevent relative rotation with respect to the motor-side rotation body when a rotation force less than a predetermined value acts between the motor-side rotation body and the take-up shaft-side rotation body, and that allows relative rotation with respect to the motor-side rotation body by sliding over the spring member when a rotation force greater than or equal to said predetermined value acts between the motor-side rotation body and the take-up shaft-side rotation body.

2. The webbing take-up device of claim 1, wherein:
   the motor-side rotation body includes a cylindrical portion that is formed in a cylindrical shape,
   the spring member includes a load receiving portion that extends in a circumferential direction of the cylindrical portion in a state where the load receiving portion abuts an inner circumferential surface of the cylindrical portion, and a deflection deformation portion that extends from at least one of two ends of the load receiving portion in an extending direction of the load receiving portion toward an inner side in a radial direction of the cylindrical portion,
   a tip end side of the deflection deformation portion engages with external teeth formed in an outer circumferential portion of the take-up shaft-side rotation body, and
   the deflection deformation portion is pushed by the external teeth to be deflect-deformed toward the side of the load receiving portion when the take-up shaft-side rotation body rotates relatively with respect to the motor-side rotation body.

3. The webbing take-up device of claim 2, wherein:
   the spring member is formed from a plate-like spring member,
   the spring member includes a base portion that is disposed in the cylindrical portion in a state where a plate thickness direction of the base portion is along an axial direction of the cylindrical portion, and
   the load receiving portion is connected to an outer circumferential portion of the base portion via a connecting portion, the connecting portion being bent such that a plate thickness direction of the load receiving portion is along the radial direction of the cylindrical portion.

4. The webbing take-up device of claim 3, wherein:
   the deflection deformation portion extends from one end of the load receiving portion in the extending direction thereof,
   the connecting portion extends from the outer circumferential portion of the base portion toward an inner circumferential surface of the cylindrical portion, and is connected to another end of the load receiving portion in the extending direction thereof, and
   the motor-side rotation body is provided with a first contact portion that abuts the other end of the load receiving portion in the extending direction thereof in a circumferential direction of the cylindrical portion and a second contact portion that abuts the connecting portion at the same side as the first contact portion.

5. The webbing take-up device of claim 3, wherein:
   the spring member includes a plurality of spring bodies each including the deflection deformation portion and the load receiving portion, and
   each of the spring bodies is connected to the base portion via one of a plurality of connecting portions.

6. The webbing take-up device of claim 2, wherein:
   the deflection deformation portions respectively extend from the two ends of the load receiving portion in the extending direction thereof, and
   the motor-side rotation body includes circumferential contact portions that abut base end sides of the deflection deformation portions in a circumferential direction of the cylindrical portion.

7. The webbing take-up device of claim 2, wherein:
   the spring member includes a plurality of separated spring bodies each including the deflection deformation portion and the load receiving portion, and
   the motor-side rotation body is provided with a contact portion that abuts a side of the another end of the load receiving portion in the extending direction thereof.

8. The webbing take-up device of claim 1, wherein at least the motor-side rotation body provided at a side of the motor with respect to the spring member is made of a resin.

* * * * *